US012793298B2

(12) United States Patent
Seeber et al.

(10) Patent No.: US 12,793,298 B2
(45) Date of Patent: Nov. 10, 2026

(54) DENTAL TREATMENT VIDEO

(71) Applicant: Align Technology, Inc., San Jose, CA (US)

(72) Inventors: Michael Seeber, Zürich (CH); Janik Lobsiger, Zürich (CH); Niko Benjamin Huber, Zug (CH); Avi Kopelman, Palo Alto, CA (US)

(73) Assignee: Align Technology, Inc., San Jose, CA (US)

( * ) Notice: Subject to any disclaimer, the term of this patent is extended or adjusted under 35 U.S.C. 154(b) by 251 days.

(21) Appl. No.: 18/496,743

(22) Filed: Oct. 27, 2023

(65) Prior Publication Data

US 2024/0144480 A1 May 2, 2024

Related U.S. Application Data

(60) Provisional application No. 63/421,492, filed on Nov. 1, 2022.

(51) Int. Cl.
*G06T 7/00* (2017.01)
*G06T 3/02* (2024.01)
(Continued)

(52) U.S. Cl.
CPC ................ *G06T 11/60* (2013.01); *G06T 3/02* (2024.01); *G06T 3/40* (2013.01); *G06T 5/10* (2013.01);
(Continued)

(58) Field of Classification Search
CPC ........... G06T 7/0012; G06T 3/02; G06T 3/40; G06T 5/10; G06T 11/60;
(Continued)

(56) References Cited

U.S. PATENT DOCUMENTS 5,975,893 A 11/1999 Chishti et al.
6,227,850 B1 5/2001 Chishti et al.
(Continued)

FOREIGN PATENT DOCUMENTS

WO WO-2006065955 A2 * 6/2006 ......... A61C 13/0004

OTHER PUBLICATIONS

Cheng et al., "Feature Flow for Frame Interpolation", Department of Computer Science, Carnegie Melon University, https://web.archive.org/web/20190728204408/http://rishub.me/feature-flow-frame.pdf (Year: 2019).*

(Continued)

*Primary Examiner* — Vu Le
*Assistant Examiner* — Rachel Anne Ometz
(74) *Attorney, Agent, or Firm* — Lowenstein Sandler LLP

(57) ABSTRACT

A method and/or system generates a video of teeth of an individual over time. In one example, images comprising teeth of an individual are received, wherein the images are arranged in a sequence and each image is associated with a different stage of treatment of the teeth. One or more of the images are modified and/or replaced to align the images to one another. One or more synthetic images are generated, wherein each synthetic image is generated based on a pair of sequential images in the sequence and is an intermediate image that comprises an intermediate state of the teeth between a first state of a first image of the pair of sequential images and a second state of a second image of the pair of sequential images. A video is then generated that comprises the images and the one or more synthetic images.

25 Claims, 15 Drawing Sheets

(51) Int. Cl.

| | |
|---|---|
| ***G06T 3/40*** | (2024.01) |
| ***G06T 5/10*** | (2006.01) |
| ***G06T 11/60*** | (2026.01) |
| ***G06V 10/24*** | (2022.01) |
| ***G06V 10/44*** | (2022.01) |
| ***G06V 40/16*** | (2022.01) |

(52) U.S. Cl.
CPC .......... *G06T 7/0012* (2013.01); *G06V 10/242* (2022.01); *G06V 10/44* (2022.01); *G06V 40/174* (2022.01); *G06T 2207/20084* (2013.01); *G06T 2207/30036* (2013.01)

(58) Field of Classification Search
CPC ........... G06T 2207/20084; G06T 2207/30036; G06V 10/242; G06V 10/44; G06V 40/174; G06V 10/56; G06V 10/82; G06V 40/171; A61B 2576/00; A61B 5/4547; A61B 5/4836; G16H 30/40
See application file for complete search history.

(56) References Cited

U.S. PATENT DOCUMENTS

| | | | |
|---|---|---|---|
| 6,227,851 | B1 | 5/2001 | Chishti et al. |
| 6,299,440 | B1 | 10/2001 | Phan et al. |
| 6,318,994 | B1 | 11/2001 | Chishti et al. |
| 6,371,761 | B1 | 4/2002 | Cheang et al. |
| 6,386,878 | B1 | 5/2002 | Pavlovskaia et al. |
| 6,406,292 | B1 | 6/2002 | Chishti et al. |
| 6,409,504 | B1 | 6/2002 | Jones et al. |
| 6,457,972 | B1 | 10/2002 | Chishti et al. |
| 6,488,499 | B1 | 12/2002 | Miller |
| 6,514,074 | B1 | 2/2003 | Chishti et al. |
| 6,554,611 | B2 | 4/2003 | Chishti et al. |
| 6,582,229 | B1 | 6/2003 | Miller et al. |
| 6,602,070 | B2 | 8/2003 | Miller et al. |
| 6,621,491 | B1 | 9/2003 | Baumrind et al. |
| 6,688,886 | B2 | 2/2004 | Hughes et al. |
| 6,726,478 | B1 | 4/2004 | Isiderio et al. |
| 6,729,876 | B2 | 5/2004 | Chishti et al. |
| 6,739,869 | B1 | 5/2004 | Taub et al. |
| 6,767,208 | B2 | 7/2004 | Kaza |
| 6,783,360 | B2 | 8/2004 | Chishti |
| 7,040,896 | B2 | 5/2006 | Pavlovskaia et al. |
| 7,063,532 | B1 | 6/2006 | Jones et al. |
| 7,074,038 | B1 | 7/2006 | Miller |
| 7,074,039 | B2 | 7/2006 | Kopelman et al. |
| 7,077,647 | B2 | 7/2006 | Choi et al. |
| 7,108,508 | B2 | 9/2006 | Hedge et al. |
| 7,134,874 | B2 | 11/2006 | Chishti et al. |
| 7,156,661 | B2 | 1/2007 | Choi et al. |
| 7,160,107 | B2 | 1/2007 | Kopelman et al. |
| 7,241,142 | B2 | 7/2007 | Abolfathi et al. |
| 7,293,988 | B2 | 11/2007 | Wen |
| 7,309,230 | B2 | 12/2007 | Wen |
| 7,357,634 | B2 | 4/2008 | Knopp |
| 7,555,403 | B2 | 6/2009 | Kopelman et al. |
| 7,637,740 | B2 | 12/2009 | Knopp |
| 7,689,398 | B2 | 3/2010 | Cheng et al. |
| 7,736,147 | B2 | 6/2010 | Kaza et al. |
| 7,746,339 | B2 | 6/2010 | Matov et al. |
| 7,844,356 | B2 | 11/2010 | Matov et al. |
| 7,844,429 | B2 | 11/2010 | Matov et al. |
| 7,865,259 | B2 | 1/2011 | Kuo et al. |
| 7,878,804 | B2 | 2/2011 | Korytov et al. |
| 7,880,751 | B2 | 2/2011 | Kuo et al. |
| 7,904,308 | B2 | 3/2011 | Arnone et al. |
| 7,930,189 | B2 | 4/2011 | Kuo |
| 7,942,672 | B2 | 5/2011 | Kuo |
| 7,970,627 | B2 | 6/2011 | Kuo et al. |
| 7,970,628 | B2 | 6/2011 | Kuo et al. |
| 8,038,444 | B2 | 10/2011 | Kitching et al. |
| 8,044,954 | B2 | 10/2011 | Kitching et al. |
| 8,075,306 | B2 | 12/2011 | Kitching et al. |
| 8,092,215 | B2 | 1/2012 | Stone-Collonge et al. |
| 8,099,268 | B2 | 1/2012 | Kitching et al. |
| 8,108,189 | B2 | 1/2012 | Chelnokov et al. |
| 8,126,726 | B2 | 2/2012 | Matov et al. |
| 8,260,591 | B2 | 9/2012 | Kass et al. |
| 8,275,180 | B2 | 9/2012 | Kuo |
| 8,401,826 | B2 | 3/2013 | Cheng et al. |
| 8,439,672 | B2 | 5/2013 | Matov et al. |
| 8,562,338 | B2 | 10/2013 | Kitching et al. |
| 8,591,225 | B2 | 11/2013 | Wu et al. |
| 8,788,285 | B2 | 7/2014 | Kuo |
| 8,843,381 | B2 | 9/2014 | Kuo et al. |
| 8,874,452 | B2 | 10/2014 | Kuo |
| 8,896,592 | B2 | 11/2014 | Boltunov et al. |
| 8,930,219 | B2 | 1/2015 | Trosien et al. |
| 9,037,439 | B2 | 5/2015 | Kuo et al. |
| 9,060,829 | B2 | 6/2015 | Sterental et al. |
| 9,125,709 | B2 | 9/2015 | Matty |
| 9,211,166 | B2 | 12/2015 | Kuo et al. |
| 9,220,580 | B2 | 12/2015 | Borovinskih et al. |
| 9,364,296 | B2 | 6/2016 | Kuo |
| 9,375,300 | B2 | 6/2016 | Matov et al. |
| 9,414,897 | B2 | 8/2016 | Wu et al. |
| 9,492,245 | B2 | 11/2016 | Sherwood et al. |
| 9,642,678 | B2 | 5/2017 | Kuo |
| 10,248,883 | B2 | 4/2019 | Borovinskih et al. |
| 10,342,638 | B2 | 7/2019 | Kitching et al. |
| 10,463,452 | B2 | 11/2019 | Matov et al. |
| 10,595,966 | B2 | 3/2020 | Carrier, Jr. et al. |
| 10,617,489 | B2 | 4/2020 | Grove et al. |
| 10,722,328 | B2 | 7/2020 | Velazquez et al. |
| 10,758,322 | B2 | 9/2020 | Pokotilov et al. |
| 10,779,718 | B2 | 9/2020 | Meyer et al. |
| 10,792,127 | B2 | 10/2020 | Kopelman et al. |
| 10,828,130 | B2 | 11/2020 | Pokotilov et al. |
| 10,835,349 | B2 | 11/2020 | Cramer et al. |
| 10,973,611 | B2 | 4/2021 | Pokotilov et al. |
| 10,996,813 | B2 | 5/2021 | Makarenkova et al. |
| 10,997,727 | B2 | 5/2021 | Xue et al. |
| 11,020,205 | B2 | 6/2021 | Li et al. |
| 11,020,206 | B2 | 6/2021 | Shi et al. |
| 11,026,766 | B2 | 6/2021 | Chekh et al. |
| 11,033,359 | B2 | 6/2021 | Velazquez et al. |
| 11,071,608 | B2 | 7/2021 | Derakhshan et al. |
| 11,096,763 | B2 | 8/2021 | Akopov et al. |
| 11,116,605 | B2 | 9/2021 | Nyukhtikov et al. |
| 11,147,652 | B2 | 10/2021 | Mason et al. |
| 11,151,753 | B2 | 10/2021 | Gao et al. |
| 11,154,381 | B2 | 10/2021 | Roschin et al. |
| 11,259,896 | B2 | 3/2022 | Matov et al. |
| 11,357,598 | B2 | 6/2022 | Cramer |
| 11,395,717 | B2 | 7/2022 | Yuryev et al. |
| 11,432,908 | B2 | 9/2022 | Kopelman et al. |
| 11,464,604 | B2 | 10/2022 | Makarenkova et al. |
| 11,478,334 | B2 | 10/2022 | Matov et al. |
| 11,484,389 | B2 | 11/2022 | Sterental et al. |
| 11,521,732 | B2 | 12/2022 | Levin et al. |
| 11,534,272 | B2 | 12/2022 | Li et al. |
| 11,553,988 | B2 | 1/2023 | Mednikov et al. |
| 11,633,268 | B2 | 4/2023 | Moalem et al. |
| 11,642,195 | B2 | 5/2023 | Gao et al. |
| 11,651,494 | B2 | 5/2023 | Brown et al. |
| 11,654,001 | B2 | 5/2023 | Roschin et al. |
| 11,707,344 | B2 | 7/2023 | Roschin et al. |
| 11,810,271 | B2 | 11/2023 | Shi et al. |
| 2003/0008259 | A1 | 1/2003 | Kuo et al. |
| 2003/0143509 | A1 | 7/2003 | Kopelman et al. |
| 2003/0207227 | A1 | 11/2003 | Abolfathi |
| 2004/0137400 | A1 | 7/2004 | Chishti et al. |
| 2004/0152036 | A1 | 8/2004 | Abolfathi |
| 2004/0197728 | A1 | 10/2004 | Abolfathi et al. |
| 2004/0259049 | A1 | 12/2004 | Kopelman et al. |
| 2005/0182654 | A1 | 8/2005 | Abolfathi et al. |
| 2005/0244791 | A1 | 11/2005 | Davis et al. |
| 2006/0127836 | A1 | 6/2006 | Wen |
| 2006/0127852 | A1 | 6/2006 | Wen |
| 2006/0127854 | A1 | 6/2006 | Wen |
| 2006/0275731 | A1 | 12/2006 | Wen et al. |
| 2006/0275736 | A1 | 12/2006 | Wen et al. |

(56) References Cited

U.S. PATENT DOCUMENTS

| | | | | |
|---|---|---|---|---|
| 2008/0306724 | A1 | 12/2008 | Kitching et al. | |
| 2008/0316209 | A1* | 12/2008 | Wen | A61C 7/00 345/419 |
| 2010/0009308 | A1 | 1/2010 | Wen et al. | |
| 2010/0068672 | A1 | 3/2010 | Arjomand et al. | |
| 2010/0068676 | A1 | 3/2010 | Mason et al. | |
| 2010/0092907 | A1 | 4/2010 | Knopp | |
| 2010/0167243 | A1 | 7/2010 | Spiridonov et al. | |
| 2013/0204599 | A1 | 8/2013 | Matov et al. | |
| 2016/0310235 | A1 | 10/2016 | Derakhshan et al. | |
| 2017/0273760 | A1 | 9/2017 | John et al. | |
| 2018/0280118 | A1 | 10/2018 | Cramer | |
| 2019/0328487 | A1 | 10/2019 | Levin et al. | |
| 2019/0328488 | A1 | 10/2019 | Levin et al. | |
| 2019/0388193 | A1 | 12/2019 | Saphier et al. | |
| 2020/0155274 | A1 | 5/2020 | Pimenov et al. | |
| 2020/0297458 | A1 | 9/2020 | Roschin et al. | |
| 2020/0306011 | A1 | 10/2020 | Chekhonin et al. | |
| 2021/0022833 | A1* | 1/2021 | Cramer | A61C 7/002 |
| 2021/0045701 | A1* | 2/2021 | Unklesbay | A61B 6/51 |
| 2021/0134436 | A1 | 5/2021 | Meyer et al. | |
| 2021/0322136 | A1* | 10/2021 | Anssari Moin | G16H 50/20 |
| 2021/0334958 | A1* | 10/2021 | Siow | G06T 7/0012 |
| 2021/0393375 | A1* | 12/2021 | Chekh | G06T 15/83 |
| 2023/0149127 | A1* | 5/2023 | Nikolskiy | G06V 10/778 433/24 |
| 2025/0009470 | A1* | 1/2025 | Gorbovskoy | G16H 30/40 |
| 2026/0020938 | A1* | 1/2026 | Ørkild | A61C 7/002 |

OTHER PUBLICATIONS

Ji, D., et al., "Deep View Morphing", IEEE Conference on Computer Vision and Pattern Recognition (CVPR), IEEE Computer Society, 2017, pp. 7092-7100.

Newell, et al., "Stacked Hourglass Networks for Human Pose Estimation," ArXiv, 2016, pp. 1-17.

Isola, et al. "Image-to-image translation with conditional adversarial networks." arXiv preprint (2017).

Reda, et al., "FILM: Frame Interpolation for Large Motion," Computer Vision and Pattern Recognition, 2022, pp. 1-19.

Yoo, et al., "Photorealistic Style Transfer via Wavelet Transforms," IEEE Xplore, 2019, pp. 9036-9045.

* cited by examiner

DENTAL TREATMENT VIDEO

RELATED APPLICATIONS

This application claims the benefit under 35 U.S.C. § 119(e) of U.S. Provisional Application No. 63/421,492, filed Nov. 1, 2022, the entire content of which is incorporated by reference herein.

TECHNICAL FIELD

Embodiments of the present disclosure relate to the field of dentistry and, in particular, to a system and method for generating videos of dental treatment outcomes from captured images and/or simulated images.

BACKGROUND

For both dental practitioners and patients who are considering undergoing orthodontic treatment and/or other dental treatment it can be helpful to generate images that show what the patients' teeth will look like after treatment is performed. Additionally, for patients that are considering undergoing treatment, it can be helpful to observe images of different stages of treatment of other patients. Additionally, for patients that have undergone treatment, it can be helpful to observe images of different stages of their treatment. However, at best available techniques generate a sequence of unconnected images that are difficult for patients that view the images to follow and glean information from.

SUMMARY

Various examples of implementations of the disclosure are provided. These examples should not be construed as limiting, and are merely for illustrative purposes.

In a $1^{st}$ example implementation, a method comprises: receiving a plurality of images comprising teeth of an individual, wherein the plurality of images are arranged in a sequence and each of the plurality of images is associated with a different stage of treatment of the teeth; performing at least one of modifying or replacing one or more images of the plurality of images to align the plurality of images to one another; generating one or more synthetic images, wherein each synthetic image of the one or more synthetic images is generated based on a pair of sequential images in the sequence and is an intermediate image that comprises an intermediate state of the teeth between a first state of a first image of the pair of sequential images and a second state of a second image of the pair of sequential images; and generating a video comprising the plurality of images and the one or more synthetic images.

A $2^{nd}$ example implementation may further extend the $1^{st}$ example implementation. In the $2^{nd}$ example implementation, modifying the one or more images of the plurality of images comprises modifying colors of the plurality of images such that colors are consistent between the plurality of images.

A $3^{rd}$ example implementation may further extend the $1^{st}$ or $2^{nd}$ example implementation. In the $3^{rd}$ example implementation, modifying the colors of the plurality of images comprises inputting the plurality of images into a trained machine learning model, wherein the trained machine learning model outputs color modifications for one or more of the plurality of images.

A $4^{th}$ example implementation may further extend the $3^{rd}$ example implementation. In the $4^{th}$ example implementation, the trained machine learning model comprises a convolutional neural network that performs one or more wavelet transforms.

A $5^{th}$ example implementation may further extend any of the $1^{st}$ through $4^{th}$ example implementations. In the $5^{th}$ example implementation, modifying an image of the one or more images comprises performing at least one of a translation, a rotation, or a scale change for one or more points of the image.

A $6^{th}$ example implementation may further extend the $5^{th}$ example implementation. In the $6^{th}$ example implementation, the method further comprises: detecting a plurality of features that are common to at least some of the plurality of images; and determining, for a pair of sequential images of the plurality of images in the sequence, and for one or more feature of the plurality of features, an affine transformation for the feature between a first image and a second image of the pair of sequential images, wherein application of the affine transformation to at least one of the first image or the second image results in at least one of the translation, the rotation, or the scale change for the one or more points of the image.

A $7^{th}$ example implementation may further extend the $6^{th}$ example implementation. In the $7^{th}$ example implementation, detecting the plurality of features for the image comprises inputting the image into a trained machine learning model, wherein the trained machine learning model outputs locations of each of the plurality of features in the image.

An $8^{th}$ example implementation may further extend $6^{th}$ or $7^{th}$ example implementations. In the $8^{th}$ example implementation, the plurality of features comprise one or more of the teeth.

A $9^{th}$ example implementation may further extend any of the $6^{th}$ through $8^{th}$ example implementations. In the $9^{th}$ example implementation, the plurality of images are of a face of the individual, wherein the teeth of the individual are visible in the plurality of images of the face, and wherein the plurality of features comprise one or more facial features.

A $10^{th}$ example implementation may further extend any of the $5^{th}$ through $9^{th}$ example implementations. In the $10^{th}$ example implementation, replacing the one or more images of the plurality of images comprises: generating, for an image of the one or more images, a replacement image having a) teeth that correspond to teeth of the image and b) one or more features that differ from one or more features of the image and that are similar to one or more features of an additional image of the plurality of images, wherein the replacement image is used to replace the image.

An $11^{th}$ example implementation may further extend the $10^{th}$ example implementation. In the $11^{th}$ example implementation, generating the replacement image comprises: processing the image and the additional image using a trained machine learning model, wherein the trained machine learning model outputs the replacement image.

A $12^{th}$ example implementation may further extend the $11^{th}$ example implementation. In the $12^{th}$ example implementation, the trained machine learning model is a generative model.

A $13^{th}$ example implementation may further extend any of the $10^{th}$ through $12^{th}$ example implementations. In the $13^{th}$ example implementation, the one or more features of the image comprise a first camera viewpoint, and wherein the one or more features of the additional image comprise a second camera viewpoint.

A $14^{th}$ example implementation may further extend any of the $10^{th}$ through $13^{th}$ example implementations. In the $14^{th}$ example implementation, the one or more features of the image comprise at least one of a first facial expression, a first jaw position, a first relation between upper jaw and lower jaw, a first color, a first lighting condition, an obstruction of the teeth, teeth attachments, a first hair style, or first clothing; and the one or more features of the additional image comprise at least one of a second facial expression, a second jaw position, a second relation between upper jaw and lower jaw, a second color, a second lighting condition, a lack of the obstruction of the teeth, a lack of the teeth attachments, a second hair style, or second clothing.

A $15^{th}$ example implementation may further extend any of the $1^{st}$ through $14^{th}$ example implementations. In the $15^{th}$ example implementation, replacing the one or more images of the plurality of images comprises: generating, for an image of the one or more images, a replacement image having a) teeth that correspond to teeth of the image and b) one or more features that differ from one or more features of the image, wherein the replacement image is used to replace the image.

A $16^{th}$ example implementation may further extend the $15^{th}$ example implementation. In the $16^{th}$ example implementation, generating the replacement image comprises: receiving an input selecting one or more target features; and processing the image and the input using a trained machine learning model, wherein the trained machine learning model outputs the replacement image having the one or more features that correspond to the one or more target features.

A $17^{th}$ example implementation may further extend any of the $1^{st}$ through $16^{th}$ example implementations. In the $17^{th}$ example implementation, generating a synthetic image of the one or more synthetic images comprises: determining, for a pair of sequential images of the plurality of images in the sequence, an optical flow between a first image and a second image of the pair of sequential images; and generating the synthetic image based on the optical flow.

An $18^{th}$ example implementation may further extend any of the $1^{st}$ through $17^{th}$ example implementations. In the $18^{th}$ example implementation, generating a synthetic image of the one or more synthetic images comprises: inputting a pair of sequential images of the plurality of images in the sequence into a trained machine learning model, wherein the trained machine learning model outputs the synthetic image.

A $19^{th}$ example implementation may further extend the $18^{th}$ example implementation. In the $19^{th}$ example implementation, the trained machine learning model comprises a generative model.

A $20^{th}$ example implementation may further extend the $19^{th}$ example implementation. In the $20^{th}$ example implementation, one or more layers of the generative model determine an optical flow between the pair of sequential images, and wherein the optical flow is used by the generative model to generate the synthetic image.

A $21^{st}$ example implementation may further extend any of the $1^{st}$ through $20^{th}$ example implementations. In the $21^{st}$ example implementation, generating a synthetic image of the one or more synthetic images comprises: transforming a first image and a second image in the sequence into a feature space; determining an optical flow between the first image and the second image in the feature space; and using the optical flow in the feature space to generate the synthetic image that is an intermediate image between the first image and the second image.

A $22^{nd}$ example implementation may further extend any of the $1^{st}$ through $21^{st}$ example implementations. In the $22^{nd}$ example implementation, generating the one or more synthetic images comprises: generating, based on a first image and a second image in the sequence, a first synthetic image that is an intermediate image between the first image and the second image; and generating, based on the first image and the first synthetic image, a second synthetic image that is an intermediate image between the first image and the first synthetic image.

A $23^{rd}$ example implementation may further extend the 22 nd example implementation. In the $23^{rd}$ example implementation, the method further comprises: determining a similarity score between the first image and the first synthetic image; and generating the second synthetic image responsive to determining that the similarity score fails to satisfy a similarity threshold.

A $24^{th}$ example implementation may further extend any of the $1^{st}$ through $23^{rd}$ example implementations. In the $24^{th}$ example implementation, a non-transitory computer readable medium comprises instructions that, when executed by a processing device, cause the processing device to perform the method of any of the $1^{st}$ through $23^{rd}$ example implementations.

A $25^{th}$ example implementation may further extend any of the $1^{st}$ through $23^{rd}$ example implementations. In the $25^{th}$ example implementation, a system comprises: a processing device; and a memory to store instructions that, when executed by the processing device, cause the processing device to perform the method of any of the $1^{st}$ through $23^{rd}$ example implementations.

In a $26^{th}$ example implementation, a method comprises: receiving an image comprising a current state of teeth of an individual; receiving or generating a treatment plan comprising a three-dimensional (3D) model of a future state of the teeth at a stage of treatment; generating a first synthetic image comprising the future state of the teeth at the stage of treatment based on the received image and the 3D model of the future state of the teeth at the stage of treatment; generating one or more additional synthetic images that are intermediate images between the received image and the first synthetic image; and generating a video comprising the received image, the one or more additional synthetic images, and the first synthetic image.

A $27^{th}$ example implementation may further extend the $26^{th}$ example implementation. In the $27^{th}$ example implementation, the received image is of a face of the individual, wherein the teeth of the individual are visible in the received image of the face, and wherein the first synthetic image and the one or more additional synthetic images are of the face.

A $28^{th}$ example implementation may further extend the $26^{th}$ or $27^{th}$ example implementation. In the $28^{th}$ example implementation, the treatment plan further comprises a second 3D model of a second future state of the teeth at a second stage of treatment, the method further comprising: generating a second synthetic image comprising the second future state of the teeth at the second stage of treatment based on the received image and the second 3D model of the second future state of the teeth at the second stage of treatment; and generating one or more further synthetic images that are intermediate images between the first synthetic image and the second synthetic image; wherein the video further comprises the one or more further synthetic images and the second synthetic image.

A $29^{th}$ example implementation may further extend and of the $26^{th}$ through $28^{th}$ example implementations. In the $29^{th}$ example implementation, generating the one or more additional synthetic images comprises: determining an optical flow between the received image and the first synthetic image; and generating the one or more additional synthetic images based on the optical flow.

A 30$^{th}$ example implementation may further extend and of the 26$^{th}$ through 29$^{th}$ example implementations. In the 30$^{th}$ example implementation, generating the one or more additional synthetic images comprises: inputting the received image and the first synthetic image into a trained machine learning model, wherein the trained machine learning model outputs the one or more additional synthetic images.

A 31$^{st}$ example implementation may further extend the 30$^{th}$ example implementation. In the 31$^{st}$ example implementation, the trained machine learning model comprises a generative model.

A 32$^{nd}$ example implementation may further extend the 31$^{st}$ example implementation. In the 32$^{nd}$ example implementation, one or more layers of the generative model determine an optical flow between the received image and the first synthetic image, and wherein the optical flow is used by the generative model to generate the one or more additional synthetic images.

A 33$^{rd}$ example implementation may further extend any of the 26$^{th}$ through 32$^{nd}$ example implementations. In the 33$^{rd}$ example implementation, generating the one or more additional synthetic images comprises: transforming the received image and the first synthetic image into a feature space; determining an optical flow between the received image and the first synthetic image in the feature space; and using the optical flow in the feature space to generate the one or more additional synthetic images that are intermediate images between the received image and the first synthetic image.

A 34$^{th}$ example implementation may further extend any of the 26$^{th}$ through 33$^{rd}$ example implementations. In the 34$^{th}$ example implementation, generating the one or more additional synthetic images comprises: generating a second synthetic image that is an intermediate image between the received image and the first synthetic image; and generating, based on the received image and the second synthetic image, a third synthetic image that is an intermediate image between the received image and the second synthetic image.

A 35$^{th}$ example implementation may further extend the 34$^{th}$ example implementation. In the 35$^{th}$ example implementation, the method further comprises: determining a similarity score between the received image and the second synthetic image; and generating the third synthetic image responsive to determining that the similarity score fails to satisfy a similarity threshold.

A 36$^{th}$ example implementation may further extend and of the 26$^{th}$ through 35$^{th}$ example implementations. In the 36$^{th}$ example implementation, a non-transitory computer readable medium comprises instructions that, when executed by a processing device, cause the processing device to perform the method of any of the 26$^{th}$ through 36$^{th}$ example implementations.

A 37$^{th}$ example implementation may further extend and of the 26$^{th}$ through 35$^{th}$ example implementations. In the 37$^{th}$ example implementation, a system comprises: a processing device; and a memory to store instructions that, when executed by the processing device, cause the processing device to perform the method of any of the 26$^{th}$ through 36$^{th}$ example implementations.

BRIEF DESCRIPTION OF THE DRAWINGS

Embodiments of the present disclosure are illustrated by way of example, and not by way of limitation, in the figures of the accompanying drawings.

DETAILED DESCRIPTION

Figure 1:
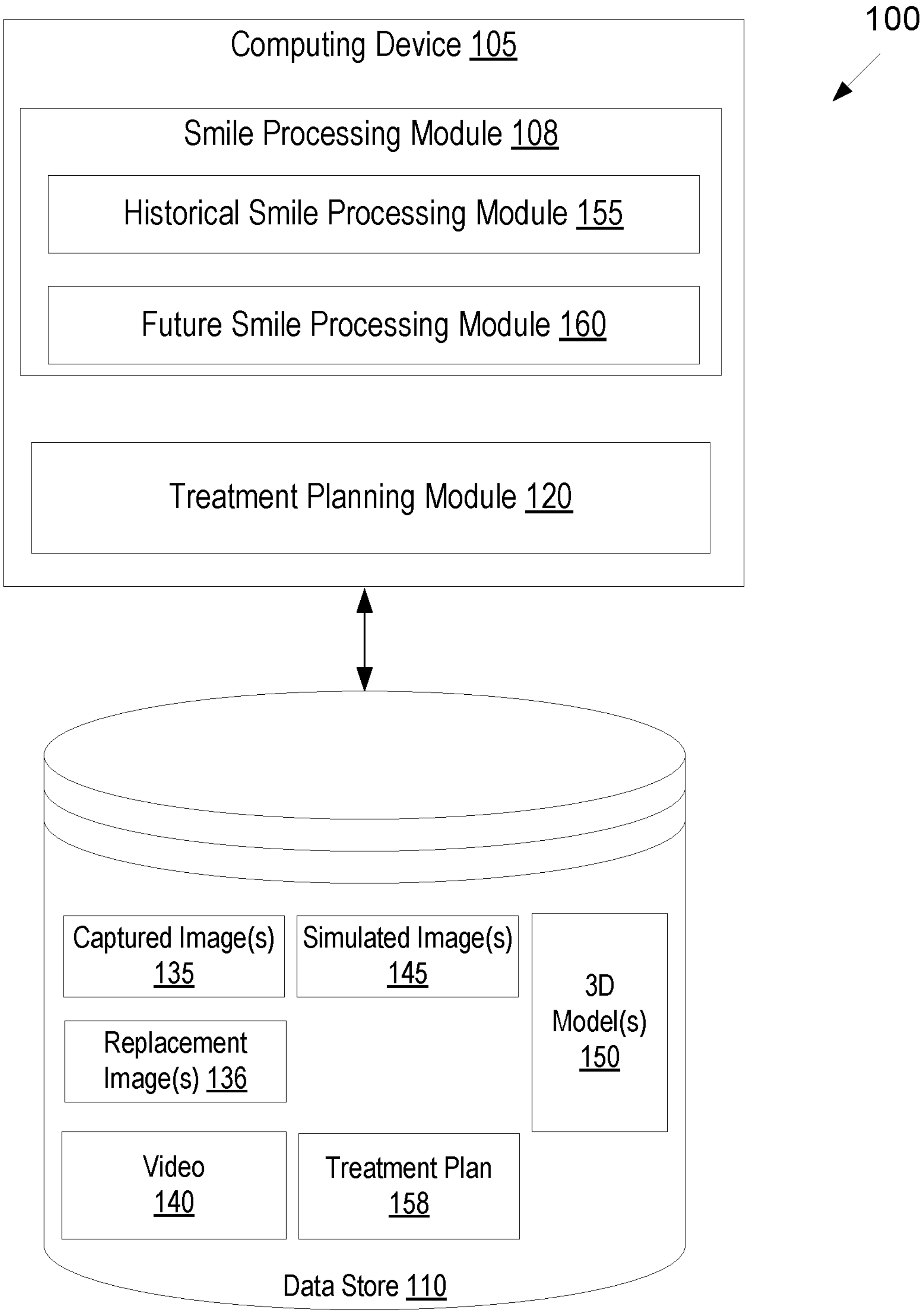
FIG. 1 illustrates one embodiment of a system for treatment planning and/or smile video generation, in accordance with an embodiment.

Described herein are methods and systems for generating videos of an individual's face, smile and/or dentition over time, in accordance with embodiments of the present disclosure. The methods and systems described herein may convert one or more images or simulated images into short videos in embodiments. The methods may be applied to show a change in dental health over time, progress of a dental treatment (e.g., orthodontic treatment and/or prosthodontic treatment) over time, and so on. The methods and systems described herein may be used for past, ongoing and/or future treatments. In an example, a treatment video may be generated that shows before and after visualizations for orthodontic treatment, restorative treatment, etc. to show how teeth shape, position and/or orientation has changed or will change over time.

In embodiments, an image processing pipeline is applied to images to transform those images into short videos in a fully automated manner. Machine learning models such as neural networks may be composed for performing operations such as key point detection, segmentation, style transfer, image generation and/or frame interpolation in the image processing pipeline. Frame interpolation may be performed using a learned hybrid data driven approach that estimates movement between images to output images that can be combined to form a visually smooth animation even for irregular input data. The frame interpolation may also be performed in a manner that can handle disocclusion, which is common for open bite images.

In embodiments, actual treatment images may be captured at irregular time intervals. Accordingly, in some embodiments a movement estimation technique is used to control intermediate frame generation, resulting in a visually smooth output video.

The same techniques described herein with reference to generating videos showing a change in dentition over time also applies to many other fields. For example, the techniques described herein with reference to generating videos of dentition over time may be used to generate videos showing occlusal views of a person's dental arches over time, visual impact to tooth shape of restorative treatment, visual impact of removing attachments (e.g., attachments used for orthodontic treatment), a person's face and/or body over time (e.g., to show the effects of aging, which may take into account changing features such as progression of wrinkles), to generate videos showing change in condition of a plant over time, a change to a geographic location over time, a change to a house or other building over time, and so on. Accordingly, it should be understood that the described examples associated with teeth, dentition, smiles, etc. also apply to any other type of object, person, living organism, place, etc. whose condition or state might change over time. Accordingly, in embodiments the techniques set forth herein may be used to generate, for example, videos of changes to any type of object, person, living organism, place, etc. over time.

In dentistry a doctor, technician or patient may periodically generate images of their smile, teeth, etc. The doctor, technician, patient, etc. may then view the periodically generated images in sequence in an attempt to gauge how the patient's dentition has changed over time. However, it can be difficult to assess how the patient's dentition has changed over time (or possibly not changed over time) simply by viewing a sequence of the images. Each image will generally have different lighting conditions, be taken from different angles and/or camera viewpoints, have different zoom settings, be of different sizes, have different colors, show different facial expressions, show different amounts of one or more teeth, and so on. Such differences can make it challenging to ascertain what has changed and what has not changed with regards to the patient's dentition over time.

Accordingly, in embodiments a system and/or method operate on the discrete images to align them both in space (e.g., by scaling, reorienting, translating, etc.) and in color (e.g., by performing color balancing between images, color matching between images, etc.). In embodiments, the system and/or method process the images to determine whether any of the images fail to satisfy one or more quality criteria (e.g., alignment criteria). For example, images taken from different camera viewpoints relative to the imaged face may contain different data. After aligning such images and generating a video from the aligned images, the video may show apparent changes and/or movement between images that should not be there. For example, if one image is taken from a camera viewpoint that is different from the camera viewpoints used for the other images, that one image may not show teeth that are shown in the other images. After alignment of that one image to the other images, that one image may still lack information for the teeth that were not captured in that image. Accordingly, the lack of those teeth in that image will show up as a motion or change between a frame of the video based on that image and frames of the video based on the other images. Accordingly, the one or more quality criteria may include a camera viewpoint criterion. An image that has a camera viewpoint that differs from camera viewpoints of other images by more than a threshold may not satisfy the camera viewpoint criterion.

In some embodiments, replacement images are generated for the one or more images that do not satisfy the one or more quality criteria. Replacement images may be generated by a trained machine learning model such as a generative model. In embodiments, a generative model such as StyleGAN is used to generate the replacement images. The generative model may receive as input an image to be replaced and style information to use to generate a replacement image. The style information may be received in the form of an additional image whose style information is to be replicated and/or an input indicating one or more style selections (e.g., value(s) indicating lighting information, color information, pose information, camera viewpoint, etc.). The replacement images may include some details from the image to be replaced and some details that are based on the input style information (e.g., details of the additional input image). The original image that failed the quality criteria may then be replaced with the synthetically generated image, which should satisfy the one or more quality criteria.

The system and/or method may generate additional synthetic images that are essentially interpolated images that show what the dentition likely looked like between the times when images were actually taken. The synthetic images are generated in a manner that they are aligned with the captured images in color and space. The modified images and synthetic images are then used to generate a video, where each of the images may be a frame of the video. The video may then be presented to a doctor, patient, etc. to clearly and smoothly show the progression of the patient's dentition over time. If the images were taken at the start of a dental treatment, and then at various stages of the dental treatment, then the video shows the progression of the dental treatment over time. If the images were taken without dental treatment (e.g., as a matter of course by the doctor at each patient visit), then the video may be used to show a progression of one or more dental conditions, such as tooth wear, gum erosion, gum swelling, caries, discoloration, and so on. Such videos serve as a powerful tool that enables the doctor to clearly show to the patient the progression of dental problems, and can help the doctor to convince the patient to undergo treatment. Additionally, videos of treatment may be used to show a patient the transformation of their dentition accomplished by the treatment (both during treatment and after treatment is completed). Such videos of prior patients can also be shown to perspective patients to show treatment examples.

In some embodiments, the system and/or method generates synthetic (simulated) images of future dentition of a patient based on a current or past image of the patient's dentition and information from a treatment plan. Accurate images can be generated of the patient's dentition for one or more future stages of treatment using three-dimensional (3D) models from the treatment plan and the current or past image of the patient's dentition. These synthetic images and the current or past image may then be used to generate additional synthetic images that are essentially interpolated images that show what the dentition is likely to look like between the what is shown in the current or past image and the synthetic image(s) associated with particular stages of treatment. The current or past image and synthetic images are then used to generate a video, where each of the images may be a frame of the video. The video may then be presented to a doctor, patient, etc. to clearly and smoothly show a likely progression of the patient's dentition over time if the patient undergoes a dental treatment.

Consumer smile simulations are simulated images or videos generated for consumers (e.g., patients) that show how the smiles of those consumers will look after some type of dental treatment (e.g., such as orthodontic treatment). Clinical smile simulations are generated simulated images or videos used by dental professionals (e.g., orthodontists, dentists, etc.) to make assessments on how a patient's smile will look after some type of dental treatment. For both consumer smile simulations and clinical smile simulations, a goal is to produce a mid-treatment or post-treatment realistic photo rendering of a patient's smile that may be used by a patient, potential patient and/or dental practitioner to view a treatment outcome. For both use cases, the general process of generating the simulated image showing the mid-treatment or post-treatment smile includes taking a picture of the patient's current smile, simulating or generating a treatment plan for the patient that indicates mid-treatment and/or post-treatment positions and orientations for teeth and gingiva, and converting data from the treatment plan back into a new simulated image showing the mid-treatment and/or post-treatment smile. Embodiments generate smile video simulations by further generating interpolated images (synthetic images that show intermediate states between stages of treatment) and then gathering all of the images together into a video.

FIG. 1 illustrates one embodiment of a treatment planning and/or smile video generation system 100. In one embodiment, the system 100 includes a computing device 105 and a data store 110. The system 100 may additionally include, or be connected to, an image capture device such as a camera and/or an intraoral scanner. The computing device 105 may include physical machines and/or virtual machines hosted by physical machines. The physical machines may be rackmount servers, desktop computers, or other computing devices. The physical machines may include a processing device, memory, secondary storage, one or more input devices (e.g., such as a keyboard, mouse, tablet, speakers, or the like), one or more output devices (e.g., a display, a printer, etc.), and/or other hardware components. In one embodiment, the computing device 105 includes one or more virtual machines, which may be managed and provided by a cloud provider system. Each virtual machine offered by a cloud service provider may be hosted on one or more physical machine. Computing device 105 may be connected to data store 110 either directly or via a network. The network may be a local area network (LAN), a public wide area network (WAN) (e.g., the Internet), a private WAN (e.g., an intranet), or a combination thereof.

Data store 110 may be an internal data store, or an external data store that is connected to computing device 105 directly or via a network. Examples of network data stores include a storage area network (SAN), a network attached storage (NAS), and a storage service provided by a cloud provider system. Data store 110 may include one or more file systems, one or more databases, and/or other data storage arrangement.

The computing device 105 may receive one or more images from an image capture device, from multiple image capture devices, from data store 110 and/or from other computing devices. The image capture device(s) may be or include a charge-coupled device (CCD) sensor and/or a complementary metal-oxide semiconductor (CMOS) sensor, for example. The image capture devices may include, for example, mobile devices (e.g., mobile phones) that may belong to a patient. Alternatively, or additionally, the image capture devices may include, for example, a camera of a doctor. The image capture device(s) may provide images or video to the computing device 105 for processing. For example, an image capture device may provide images to the computing device 105 that the computing device analyzes to identify a patient's mouth, a patient's face, a patient's dental arch, or the like. In some embodiments, the images captured by the image capture device may be stored in data store 110 as captured images 135. For example, captured images 135 may be stored in data store 110 as a record of patient history or for computing device 105 to use for analysis of the patient and/or for generation of simulated post-treatment images and/or a video such as a smile video, a dental stage progression video, etc. The image capture device may transmit the discrete images and/or video to the computing device 105, and computing device 105 may store the captured images 135 in data store 110. In some embodiments, the captured images 135 include two-dimensional data.

In some embodiments, the image capture device is a device located at a doctor's office. In some embodiments, the image capture device is a device of a patient. For example, a patient may use a webcam, mobile phone, tablet computer, notebook computer, digital camera, etc. to take one or more photos of their teeth, smile and/or face. The patient may then send those photos to computing device 105, which may then be stored as captured images 135 in data store 110.

Computing device 105 includes a smile processing module 108 and a treatment planning module 120 in embodiments. The treatment planning module 120 is responsible for generating a treatment plan 158 that includes a treatment outcome for a patient. The treatment plan may be stored in data store 110 in embodiments. The treatment plan 158 may include and/or be based on one or more 2D images and/or intraoral scans of the patient's dental arches. For example, the treatment planning module 120 may receive 3D intraoral scans of the patient's dental arches based on intraoral scanning performed using an intraoral scanner. One example of an intraoral scanner is the iTero® intraoral digital scanner manufactured by Align Technology, Inc. Another example of an intraoral scanner is set forth in U.S. Publication No. 2019/0388193, filed Jun. 19, 2019, which is incorporated by reference herein.

During an intraoral scan session, an intraoral scan application receives and processes intraoral scan data (e.g., intraoral scans) and generates a 3D surface of a scanned region of an oral cavity (e.g., of a dental site) based on such processing. To generate the 3D surface, the intraoral scan application may register and "stitch" or merge together the intraoral scans generated from the intraoral scan session in real time or near-real time as the scanning is performed. Once scanning is complete, the intraoral scan application may then again register and stitch or merge together the intraoral scans using a more accurate and resource intensive sequence of operations. In one embodiment, performing registration includes capturing 3D data of various points of a surface in multiple scans (views from a camera), and registering the scans by computing transformations between the scans. The 3D data may be projected into a 3D space for the transformations and stitching. The scans may be integrated into a common reference frame by applying appropriate transformations to points of each registered scan and projecting each scan into the 3D space.

In one embodiment, registration is performed for adjacent or overlapping intraoral scans (e.g., each successive frame of an intraoral video). Registration algorithms are carried out to register two or more adjacent intraoral scans and/or to register an intraoral scan with an already generated 3D surface, which essentially involves determination of the transformations which align one scan with the other scan and/or with the 3D surface. Registration may involve identifying multiple points in each scan (e.g., point clouds) of a scan pair (or of a scan and the 3D model), surface fitting to the points, and using local searches around points to match points of the two scan (or of the scan and the 3D surface). For example, an intraoral scan application may match points of one scan with the closest points interpolated on the surface of another image, and iteratively minimize the distance between matched points. Other registration techniques may also be used. The intraoral scan application may repeat registration and stitching for all scans of a sequence of intraoral scans and update the 3D surface as the scans are received.

Treatment planning module 120 may perform treatment planning in an automated fashion and/or based on input from a user (e.g., from a dental technician). The treatment planning module 120 may receive and/or store the 3D model 150 of the current dental arch of a patient, and may then determine current positions and orientations of the patient's teeth from the virtual 3D model 150 and determine target final positions and orientations for the patient's teeth represented as a treatment outcome (e.g., final stage of treatment). The treatment planning module 120 may then generate a virtual 3D model 150 showing the patient's dental arches at the end of treatment as well as one or more virtual 3D models 150 showing the patient's dental arches at various intermediate stages of treatment. Alternatively, or additionally, the treatment planning module 120 may generate one or more 3D images and/or 2D images showing the patient's dental arches, teeth, smile, etc. at various stages of treatment.

By way of non-limiting example, a treatment outcome may be the result of a variety of dental procedures. Such dental procedures may be broadly divided into prosthodontic (restorative) and orthodontic procedures, and then further subdivided into specific forms of these procedures. Additionally, dental procedures may include identification and treatment of gum disease, sleep apnea, and intraoral conditions. The term prosthodontic procedure refers, inter alia, to any procedure involving the oral cavity and directed to the design, manufacture or installation of a dental prosthesis at a dental site within the oral cavity, or a real or virtual model thereof, or directed to the design and preparation of the dental site to receive such a prosthesis. A prosthesis may include any restoration such as implants, crowns, veneers, inlays, onlays, and bridges, for example, and any other artificial partial or complete denture. The term orthodontic procedure refers, inter alia, to any procedure involving the oral cavity and directed to the design, manufacture or installation of orthodontic elements at a dental site within the oral cavity, or a real or virtual model thereof, or directed to the design and preparation of the dental site to receive such orthodontic elements. These elements may be appliances including but not limited to brackets and wires, retainers, clear aligners, or functional appliances. Any of treatment outcomes or updates to treatment outcomes described herein may be based on these orthodontic and/or dental procedures. Examples of orthodontic treatments are treatments that reposition the teeth, treatments such as mandibular advancement that manipulate the lower jaw, treatments such as palatal expansion that widen the upper and/or lower palate, and so on. For example, an update to a treatment outcome may be generated by interaction with a user to perform one or more procedures to one or more portions of a patient's dental arch or mouth. Planning these orthodontic procedures and/or dental procedures may be facilitated by the AR system described herein.

A treatment plan for producing a particular treatment outcome may be generated by first generating an intraoral scan of a patient's oral cavity. From the intraoral scan a virtual 3D model 150 of the upper and/or lower dental arches of the patient may be generated. A dental practitioner or technician may then determine a desired final position and orientation for the patient's teeth on the upper and lower dental arches, for the patient's bite, and so on.

This information may be used to generate a virtual 3D model 150 of the patient's upper and/or lower arches after orthodontic and/or prosthodontic treatment. This data may be used to create an orthodontic treatment plan, a prosthodontic treatment plan (e.g., restorative treatment plan), and/or a combination thereof. An orthodontic treatment plan may include a sequence of orthodontic treatment stages. Each orthodontic treatment stage may adjust the patient's dentition by a prescribed amount, and may be associated with a 3D model 150 of the patient's dental arch that shows the patient's dentition at that treatment stage.

In some embodiments, the treatment planning module 120 may receive or generate one or more virtual 3D models 150, virtual 2D models, 3D images, 2D images (e.g., captured images 135 and/or simulated images 145), or other treatment outcome models and/or images.

In some embodiments, smile processing module 180 includes a historical smile processing module 155 and/or a future smile processing module 160. Historical smile processing module 155 may operate on already received images to align those images, generate replacement images, perform interpolation to generate intermediate simulated images (also referred to as synthetic images), and/or generate a video (e.g., smile video 140) based on the received images, the replacement images and/or the simulated images. In some embodiments, smile processing module 180 generates one or more replacement images 136 for one or more captured images 135, as discussed in greater detail below. Synthetic images and simulated images may be images that have been generated by a machine learning model (e.g., that were not generated by an image sensor).

Future smile processing module 160 may use a seed image of a patient's dentition and data from a treatment plan for the patient to generate simulated images of the patient's dentition during future stages of treatment and/or after the treatment, and generate a video (e.g., smile video 140) based on the seed image and the simulated images of the future stages of treatment. In some instances, a patient may start treatment, and part way through treatment a video of the patient's smile may be generated using a combination of historical smile processing module 155 and future smile processing module 160. For example, historical smile processing module 155 may use images taken before treatment was begun and during past stages of treatment to generate first frames of a video, and future smile processing module 160 may use a latest image of a current state of the patient's dentition and data from the treatment plan (e.g., 3D models of future stages of treatment) to generate simulated images showing what the patient's dentition will look like at the future stages of treatment and in between. The images generated by the historical smile processing module 155 and the images generated by the future smile processing module 160 may then be combined into a single video (e.g., smile video 140) showing progression of the patient's dentition up to present day and expected future progression of the patient's dentition up to the final treatment goal.

In embodiments, historical smile processing module 155 performs a sequence of operations to align captured images of a patient's dentition, optionally replace one or more of the captured images, and then to interpolate additional simulated images, and to ultimately generate a smile video 140 showing the progression of the patient's dental state over time. The operations may at a high level be divided into a color transfer operation, a landmark detection operation, a physical alignment operation, an image replacement operation, and an interpolation operation (also referred to as an image generation operation). The color transfer operation may include modifying the colors of one or more of the images so that colors match and/or are aligned between the images. The landmark detection operation may include identifying features that are common to each of the images, such as the front teeth (e.g., front 6 teeth) of the patient, the nose, eyes, ears, etc. of the patient, and so on. The alignment operation may include determining affine transformations between images (e.g., between sequential images), and then applying the affine transformations by performing translation, rotation, and/or scale adjustment to one or more of the images so that the images are aligned in space, have a same size, and so on. The image replacement operation may include determining that one or more images fail to satisfy one or more quality criteria, generating synthetic replacement images for the one or more images, and replacing the one or more images with the respective one or more replacement images. The interpolation operation may then be performed one or more times, optionally recursively, to generate intermediate images showing states of the patient's dentition between images that were captured. Finally all of the modified and generated images may be added as frames to a smile video 140 that shows the progression of the patient's smile (e.g., dental arches, dentition, teeth, etc.) over time. One possible sequence of operations performed by historical smile processing module 155 to generate a smile video 140 is shown in FIGS. 3A-E and FIGS. 4A-E.

In some embodiments, the sequence of operations performed by historical smile processing module 155 includes one or more of the above described operations as well as one or more further operations such as distortion correction operations, blur correction operations, and so on. In one embodiment, to perform distortion correction, landmarks are detected from a generated 3D model of a patient's dental arch. The detected 3D landmarks can then be used to correct distortion that is induced by a camera that generated one or more of the historical images. For example, the detected landmarks can be used to undistort the image and artificially increase a focal length. In some instances, intraoral scans that were used to generate the 3D model may be used for distortion correction. In an embodiment, a rigid fitting step may be performed, where an intraoral scan is fit to each image separately, providing an estimate of camera location & focal length of each image. Then each image can be warped, such that the camera location & focal length agree across all images to ultimately remove distortion from images.

In one embodiment, one or more image selection operations are performed on images. Patients may submit blurry and low resolution images captured with frontal cameras (e.g., of mobile devices). One or more detectors and/or heuristics may be used to select a subset of images that are then used to generate a final video. The heuristics/detectors may analyze images, and may include criteria or rules that should be satisfied for an image to be used in video generation. Examples of criteria include a criterion that images are of an open bite, that a patient is not wearing aligners in the images, that a patient face has an angle to a camera that is within a target range (e.g., camera viewpoint is within a target range), and so on. In one embodiment, one or more unblur (also referred to as blur removal) and/or image upscale operations may be performed as part of the sequence of operations. For images that do not satisfy the criteria for image selection, rather than excluding the images processing logic may perform one or more operations to improve those images such that they would satisfy the one or more criteria after being modified. This may include unblur operations and/or upscaling operations where a trained machine learning model converts "bad photos" into high resolution images that are sharp and crisp. In one embodiment, rather than discarding images that fail to satisfy the one or more criteria or rules, processing logic selects such images for replacement, and generates synthetic replacement images to replace those images as described in greater detail below.

Figure 2:
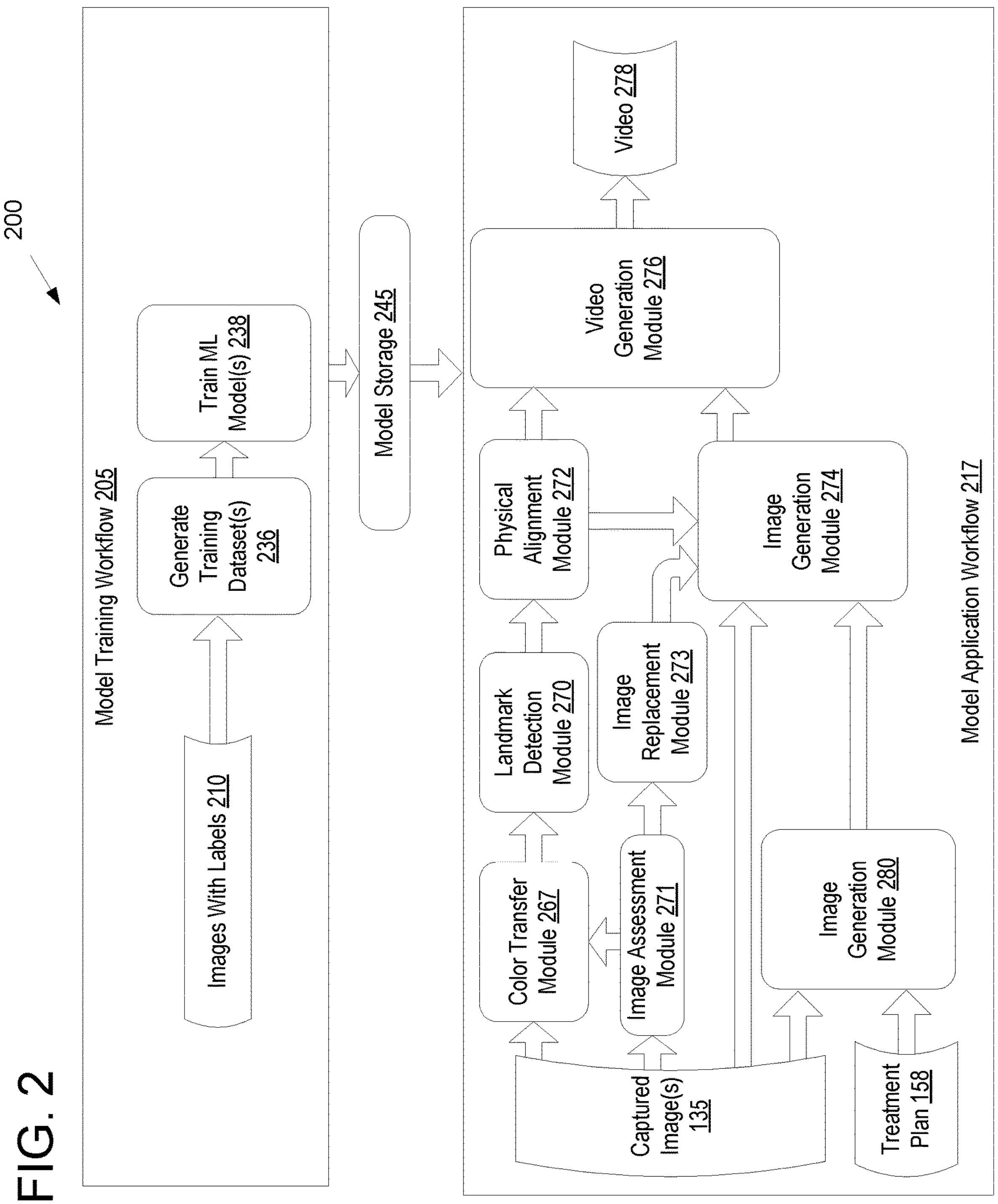
FIG. 2 illustrates a model training workflow and a model application workflow for a smile processing module, in accordance with an embodiment of the present disclosure.

Various operations, such as the color transfer operation, landmark detection operation, image generation operation, unblur operation, upscale operation, image selection operation, distortion correction operation, image replacement operation, etc. may be performed using, and/or with the assistance of, one or more trained machine learning models. FIG. 2 illustrates a model training workflow 205 and a model application workflow 217 for the smile processing module, in accordance with an embodiment of the present disclosure. In embodiments, the model training workflow 205 may be performed at a server, and the trained models are provided to a smile processing module on another computing device (e.g., computing device 105 of FIG. 1), which may perform the model application workflow 217. The model training workflow 205 and the model application workflow 217 may be performed by processing logic executed by a processor of a computing device. One or more of these workflows 205, 217 may be implemented, for example, by one or more machine learning models implemented in smile processing module 108 or other software and/or firmware executing on a processing device of computing device 1000 shown in FIG. 10.

The model training workflow 205 is to train one or more machine learning models (e.g., deep learning models) to perform one or more classifying, image generation, landmark detection, color transfer, segmenting, detection, recognition, etc. tasks for images of smiles, teeth, dentition, faces, etc. The model application workflow 217 is to apply the one or more trained machine learning models to perform the classifying, image generation, landmark detection, color transfer, segmenting, detection, recognition, etc. tasks for images of smiles, teeth, dentition, faces, etc.

Many different machine learning outputs are described herein. Particular numbers and arrangements of machine learning models are described and shown. However, it should be understood that the number and type of machine learning models that are used and the arrangement of such machine learning models can be modified to achieve the same or similar end results. Accordingly, the arrangements of machine learning models that are described and shown are merely examples and should not be construed as limiting. Additionally, embodiments discussed with reference to machine learning models may also be implemented using traditional rule based engines.

In embodiments, one or more machine learning models are trained to perform one or more of the below tasks. Each task may be performed by a separate machine learning model. Alternatively, a single machine learning model may perform each of the tasks or a subset of the tasks. Additionally, or alternatively, different machine learning models may be trained to perform different combinations of the tasks. In an example, one or a few machine learning models may be trained, where the trained ML model is a single shared neural network that has multiple shared layers and multiple higher level distinct output layers, where each of the output layers outputs a different prediction, classification, identification, etc. The tasks that the one or more trained machine learning models may be trained to perform are as follows:

I) Color modification/transfer—this can include modifying the colors, white balance, luminance, etc. of one or more images so that colors, white balance, luminance, etc. is uniform or approximately uniform across images. In some embodiments, color modification/transfer is performed using a trained machine learning model that performs a wavelet transform. Examples of such machine learning models include style transfer machine learning model, such as a whitening and color transform (WCT) model. One example of a WCT model that may be used in embodiments is described in Jaejun Yoo, et al., Photorealistic Style Transfer via Wavelet Transforms, Sep. 29, 2019, which is incorporated by reference herein in its entirety.

II) Dental object segmentation—this can include performing point-level classification (e.g., pixel-level classification or voxel-level classification) of different types of dental objects from images. The different types of dental objects may include, for example, teeth, gingiva, an upper palate, a preparation tooth, a restorative object other than a preparation tooth, an implant, a bracket, an attachment to a tooth, soft tissue, a retraction cord (dental wire), blood, saliva, and so on. In some embodiments, images of dentition are segmented into individual teeth, and optionally into gingiva.

III) Landmark detection—this can include identifying landmarks in images. The landmarks may be particular types of features, such as centers of teeth in embodiments. In some embodiments, landmark detection is performed after dental object segmentation. In some embodiments, dental object segmentation and landmark detection are performed together by a single machine learning model. In one embodiment, one or more stacked hourglass networks are used to perform landmark detection. One example of a model that may be used to perform landmark detection is a convolutional neural network that includes multiple stacked hourglass models, as described in Alejandro Newell et al., Stacked Hourglass Networks for Human Pose Estimation, Jul. 26, 2016, which is incorporated by reference herein in its entirety.

IV) Image generation/interpolation—this can include generating (e.g., interpolating) simulated images that show teeth, gums, etc. as they might look between those teeth, gums, etc. in images at hand. Such images may be photo-realistic images. In some embodiments, a generative model such as a generative adversarial network (GAN), encoder/decoder model, diffusion model, variational autoencoder (VAE), neural radiance field (NeRF), etc. is used to generate intermediate simulated images. In one embodiment, a generative model is used that determines features of two input images in a feature space, determines an optical flow between the features of the two images in the feature space, and then uses the optical flow and one or both of the images to generate a simulated image. In one embodiment, a trained machine learning model that determines frame interpolation for large motion is used, such as is described in Fitsum Reda at al., FILM: Frame Interpolation for Large Motion, Proceedings of the European Conference On Computer Vision (ECC) (2022), which is incorporated by reference herein in its entirety.

V) Image generation—this can include generating estimated images (e.g., 2D images) of how a patient's teeth are expected to look at a future stage of treatment (e.g., at an intermediate stage of treatment and/or after treatment is completed). Such images may be photo-realistic images. In embodiments, a generative model (e.g., such as a GAN, encoder/decoder model, etc.) operates on a extracted image features of a current image and a 2D projection of a 3D model of a future state of the patient's dental arch to generate a simulated image.

VI) Image replacement—this can include a form of image generation in which a synthetic replacement image is generated to replace an image that fails to satisfy one or more quality criteria (e.g., one or more alignment criteria). In one embodiment, a style generative adversarial network (StyleGAN) is used to generate the one or more replacement images. The StyleGAN may receive as in put an image to be replaced and a style input, which may be another image and/or other style information (e.g., indicating target lighting conditions, camera viewpoint, pose information, etc.).

VII) Optical flow determination—this can include using a trained machine learning model to predict or estimate optical flow between images. Such a trained machine learning model may be used to make any of the optical flow determinations described herein.

One type of machine learning model that may be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, a deep learning model that performs whitening and color transfers (WCT) is used, such as for a color transfer module 267. The model may be trained to perform a photorealistic style transfer between images that are to be merged to form a video. The model may recover the structural information of a given content image while it stylizes the image faithfully (e.g., based on a second input image) at the same time. In one embodiment, the model performs a wavelet corrected transfer based on Whitening and Coloring Transforms (WCT). WCT can perform style transfer with arbitrary styles by directly matching the correlation between content and style in a visual geometry group (VGG) feature domain. The model may project the content features to the eigenspace of style features by calculating singular value decomposition (SVD). The final stylized image may be obtained by feeding the transferred features into a decoder. In embodiments, a multi-level stylization framework is employed that applies WCT to multiple encoder-decoder pairs.

In one embodiment, a pose estimation model is used to perform landmark detection, and to essentially detect the pose of a patient's face and/or teeth in images, such as for a landmark detection module 270. In one embodiment, the pose estimation model is a convolutional neural network that includes multiple stacked hourglass neural network modules end-to-end. This allows for repeated bottom-up, top-down inference across scales.

In one embodiment, a generative model is used for one or more machine learning models. The generative model may be a generative adversarial network (GAN), encoder/decoder model, diffusion model, variational autoencoder (VAE), neural radiance field (NeRF), or other type of generative model. The generative model may be used, for example, in image generation module 274.

A GAN is a class of artificial intelligence system that uses two artificial neural networks contesting with each other in a zero-sum game framework. The GAN includes a first artificial neural network that generates candidates and a second artificial neural network that evaluates the generated candidates. The GAN learns to map from a latent space to a particular data distribution of interest (a data distribution of changes to input images that are indistinguishable from photographs to the human eye), while the discriminative network discriminates between instances from a training dataset and candidates produced by the generator. The generative network's training objective is to increase the error rate of the discriminative network (e.g., to fool the discriminator network by producing novel synthesized instances that appear to have come from the training dataset). The generative network and the discriminator network are co-trained, and the generative network learns to generate images that are increasingly more difficult for the discriminative network to distinguish from real images (from the training dataset) while the discriminative network at the same time learns to be better able to distinguish between synthesized images and images from the training dataset. The two networks of the GAN are trained once they reach equilibrium. The GAN may include a generator network that generates artificial intraoral images and a discriminator network that attempts to differentiate between real images and artificial intraoral images. In embodiments, the discriminator network may be a MobileNet.

In embodiments, a generative model that is used is a generative model trained to perform frame interpolation—synthesizing intermediate images between a pair of input frames or images. The generative model may receive a pair of input images, and generate an intermediate image that can be placed in a video between the pair of images, such as for frame rate upscaling. In one embodiment, the generative model has three main stages, including a shared feature extraction stage, a scale-agnostic motion estimation stage, and a fusion stage that outputs a resulting color image. The motion estimation stage in embodiments is capable of handling a time-wise non-regular input data stream. Feature extraction may include determining a set of features of each of the input images in a feature space, and the scale-agnostic motion estimation may include determining an optical flow between the features of the two images in the feature space. The optical flow and data from one or both of the images may then be used to generate the intermediate image in the fusion stage. The generative model may be capable of stable tracking of features without artifacts for large motion. The generative model may handle disocclusions in embodiments. Additionally the generative model may provide improved image sharpness as compared to traditional techniques for image interpolation. In embodiments, the generative model generates simulated images recursively. The number of recursions may not be fixed, and may instead be based on metrics computed from the images.

In one embodiment, one or more machine learning model is a conditional generative adversarial (cGAN) network, such as pix2pix. These networks not only learn the mapping from input image to output image, but also learn a loss function to train this mapping. GANs are generative models that learn a mapping from random noise vector z to output image y, G: $z \rightarrow y$. In contrast, conditional GANs learn a mapping from observed image x and random noise vector z, to y, G: $\{x, z\} \rightarrow y$. The generator G is trained to produce outputs that cannot be distinguished from "real" images by an adversarially trained discriminator, D, which is trained to do as well as possible at detecting the generator's "fakes". The generator may include a U-net or encoder-decoder architecture in embodiments. The discriminator may include a MobileNet architecture in embodiments. An example of a cGAN machine learning architecture that may be used is the pix2pix architecture described in Isola, Phillip, et al. "Image-to-image translation with conditional adversarial networks." arXiv preprint (2017).

In one embodiment, one or more machine learning model that is used to generate replacement images is a StyleGAN. StyleGAN is an extension to a GAN architecture to give control over disentangled style properties of generated images. In at least one embodiment, a generative network is a generative adversarial network (GAN) that includes a generator model and a discriminator model, where a generator model includes use of a mapping network to map points in latent space to an intermediate latent space, includes use of the intermediate latent space to control style at each point in the generator model, and uses introduction of noise as a source of variation at one or more points in the generator model. A resulting generator model is capable not only of generating impressively photorealistic high-quality synthetic images, but also offers control over a style of generated images at different levels of detail through varying style vectors and noise. Each style vector may correspond to a parameter or feature of clinical information or a parameter or feature of non-clinical information. For example, there may be one style vector for camera viewpoint or face pose, one style vector for lighting, one style vector for patient clothing, one style vector for attachments, one style vector for facial expression, and so on in embodiments. In at least one embodiment, a generator starts from a learned constant input and adjusts a "style" of an image at each convolution layer based on a latent code, therefore directly controlling a strength of image features at different scales.

In at least one embodiment, a StyleGAN generator uses two sources of randomness to generate a synthetic image: a standalone mapping network and noise layers, in addition to a starting point from latent space. An output from a mapping network is a vector that defines styles that is integrated at each point in a generator model via a layer called adaptive instance normalization. Use of this style vector gives control over style of a generated image. In at least one embodiment, stochastic variation is introduced through noise added at each point in a generator model. Noise may be added to entire feature maps that allow a model to interpret a style in a fine-grained, per-pixel manner. This per-block incorporation of style vector and noise allows each block to localize both an interpretation of style and a stochastic variation to a given level of detail.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available.

For the model training workflow 205, a training dataset containing hundreds, thousands, tens of thousands, hundreds of thousands or more images should be used to form a training dataset. In embodiments, images of up to millions of cases of patient dentition that may have underwent a prosthodontic procedure and/or an orthodontic procedure may be available for forming a training dataset, where each case may include various labels of one or more types of useful information. Each case may include, for example, data showing a 3D model, intraoral scans, height maps, color images at various stages of treatment, NIRI images, etc. of one or more dental sites, data showing pixel-level segmentation of the data (e.g., 3D model, intraoral scans, height maps, color images, NIRI images, etc.) into various dental classes (e.g., tooth, restorative object, gingiva, moving tissue, upper palate, etc.), data showing one or more assigned classifications for the data (e.g., tooth, gingiva, upper palate, nose, eyes, etc.), data associated with different style vectors, and so on. This data may be processed to generate one or multiple training datasets 236 for training of one or more machine learning models. The machine learning models may be trained, for example, to modify colors of images, perform landmark detection, perform segmentation, perform interpolation of images, generate replacement images, and so on. Such trained machine learning models can be added to a smile processing module, such as smile processing module 108 of FIG. 1, once trained.

In one embodiment, generating one or more training datasets 236 includes gathering one or more images with labels 210. The labels that are used may depend on what a particular machine learning model will be trained to do. For example, to train a machine learning model to perform classification of dental sites and ultimately landmark detection (e.g., landmark detection module 270), a training dataset 236 may include pixel-level labels of various types of dental sites, such as teeth, gingiva, and so on.

Processing logic may gather a training dataset 236 comprising images having one or more associated labels. One or more images, scans, surfaces, and/or models and optionally associated probability maps in the training dataset 236 may be resized in embodiments. For example, a machine learning model may be usable for images having certain pixel size ranges, and one or more image may be resized if they fall outside of those pixel size ranges. The images may be resized, for example, using methods such as nearest-neighbor interpolation or box sampling. The training dataset may additionally or alternatively be augmented. Training of large-scale neural networks generally uses tens of thousands of images, which are not easy to acquire in many real-world applications. Data augmentation can be used to artificially increase the effective sample size. Common techniques include random rotation, shifts, shear, flips and so on to existing images to increase the sample size.

To effectuate training, processing logic inputs the training dataset(s) 236 into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above.

Training may be performed by inputting one or more of the images into the machine learning model one at a time. Each input may include data from an image from the training dataset. The machine learning model processes the input to generate an output. An artificial neural network includes an input layer that consists of values in a data point (e.g., intensity values and/or height values of pixels in a height map). The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction and/or output that the machine learning model can produce. For example, for an artificial neural network being trained to perform dental site classification, there may be a first class (tooth), a second class (gums), and/or one or more additional dental classes. Moreover, the class, prediction, etc. may be determined for each pixel in the image/scan/surface, may be determined for an entire image/scan/surface, or may be determined for each region or group of pixels of the image/scan/surface. For pixel level segmentation, for each pixel in the image, the final layer applies a probability that the pixel of the image belongs to the first class, a probability that the pixel belongs to the second class, and/or one or more additional probabilities that the pixel belongs to other classes.

Accordingly, the output may include one or more prediction and/or one or more a probability map. For example, an output probability map may comprise, for each pixel in an input image/scan/surface, a first probability that the pixel belongs to a first dental class, a second probability that the pixel belongs to a second dental class, and so on. For example, the probability map may include probabilities of pixels belonging to dental classes representing a tooth, gingiva, or a restorative object.

Processing logic may then compare the generated probability map and/or other output to the known probability map and/or label that was included in the training data item. Processing logic determines an error (i.e., a classification error) based on the differences between the output probability map or prediction and/or label(s) and the provided probability map and/or label(s). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

Once one or more trained ML models 238 are generated, they may be stored in model storage 245, and may be added to a smile processing module or other application (e.g., smile processing module 108 of FIG. 1). Smile processing module 108 may then use the one or more trained ML models 238 as well as additional processing logic to generate smile videos in embodiments.

In one embodiment, model application workflow 217 includes one or more trained machine learning models and/or other logics/modules arranged in a pipeline that generates videos of faces, smiles and/or teeth. For model application workflow 217, according to one embodiment, one or more captured images 135 are received. The captured images 135 may include, for example, an image of a current state of a patient's dentition, images of various states of the patient's dentition over the course of dental treatment, and so on.

The captured image(s) 135 may be input into an image assessment module 271. Image assessment module 271 may process the images to determine whether the images satisfy one or more quality criteria. Image assessment module 271 may determine, for example, whether input images show a sufficient amount of teeth (e.g., whether a patient is smiling in an input image), whether input images are too blurry, whether input images have a camera viewpoint and/or face pose that are within a threshold range, and so on. For images that satisfy the quality criteria, the images may be input into color transfer module 267. For images that do not satisfy the quality criteria, at least some of those images may be input into image replacement module 273. Alternatively, images that do not satisfy the quality criteria may be discarded. In some embodiments, image assessment module 271 and/or image replacement module 273 are not used.

In some embodiments, image assessment module 271 may include a segmentation module, which may segment the images. Segmentation information for the images may be used to determine whether the images satisfy the one or more quality criteria in some embodiments.

Image replacement module 273 may receive one or more captured images 135 to be replaced and/or one or more additional captured images 135 from which style information is to be copied in embodiments. Image replacement module 273 may be a StyleGAN trained to generate synthetic replacement images of input images of faces, smiles, teeth, etc.

The application that applies the model application workflow 217 (e.g., smile processing module 108) may include a user interface (e.g., such as a graphical user interface (GUI)). The user interface may provide options for selection of one or more properties of the one or more images input into image replacement module 273 for inclusion in a generated synthetic replacement image. For example, via the user interface a user may select to retain the facial hair, hair color, worn accessories, pose, facial expression, lighting conditions, age, weight, lack of attachments, and so on from one or more input images. In some embodiments, the user interface receives the images and/or second segmentation information from image assessment module 271. The images and/or segmentation information may be output to a display. A user may then use a mouse pointer or touch screen, for example, to select (e.g., click on) regions in one or more of the images. Regions that are selected in an image may be retained in a generated synthetic image in embodiments. In some embodiments, the user interface provides a menu (e.g., a drop down menu) providing different features of clinical and/or non-clinical information from a first input image and/or features of clinical and/or non-clinical information from a second input image. The menu may include generic graphics for the respective features, may not include graphics for the respective features, or may include custom graphics for the respective features as determined from the images and/or segmentation information. From the menu a user may select which features to retain from the one or more of the images.

The user interface may additionally provide options that enable a user to select values of one or more properties (e.g., of tooth color, lighting, pose, etc.) to be included in generated synthetic images. The selected values for the properties may not correspond to values of the properties from any of the input images. The user interface may include, for example, a slider associated with one or more features. A user may move a slider position of such a slider to a desired location, which may be associated with a particular value of the property for that feature.

Image replacement module 273 receives the one or more input images, and optionally receives segmentation information for those images and/or selected properties to retain from the one or more of the images and/or values of one or more properties to apply for a generated image. The image replacement module 273 receives these inputs and processes them to generate a synthetic replacement image for one or more images that failed to satisfy image quality criteria. The synthetic image may retain the clinical information from the image to be replaced and may include additional information that is based on a style provided by a second input image (e.g., that did satisfy the quality criteria). In an example, most captured images 135 may have been captured from a same camera viewpoint (e.g., which may mean that the face of the imaged patient has a same post in each of those images). However, one or more of the captured images 135 may have been captured from a different camera viewpoint (e.g., the imaged patient may have a different pose in one or more images). Those images that have a different camera viewpoint and/or pose than a majority of the images may fail to satisfy the quality criteria, and may be flagged for replacement. Image assessment module 271 may additionally identify an image that is a "best" image from the captured images 135. The "best" image may have optimal lighting conditions, minimal blur, a target camera viewpoint, and so on. The selected "best" image may be used as a reference image in embodiments. The reference image may be input into image replacement module 273 along with an image to be replaced. Style information from the reference image may be used by the image replacement module 273 in generation of a replacement image.

Image replacement module 273 may generate a new synthetic replacement image that retains first selected or predetermined information (e.g., clinical and/or non-clinical information, first features, teeth data, etc.) from the image being replaced (e.g., information on the teeth from the image being replaced) and that retains information from the reference image (e.g., one or more features of the reference images that are different from features of the image to be replaced). In some embodiments, image replacement module 273 generates a replacement image that includes the teeth of the image being replaced, the patient face of the image being replaced, etc., but from a camera viewpoint and/or face pose as provided in the reference image. In some embodiments, the image being replaced may have attachments on one or more teeth, may have a tongue, fingers, etc. obscuring one or more teeth, may have poor lighting conditions, etc. In the reference image the teeth may not be obscured by a tongue, fingers, etc. Additionally, or alternatively, in the reference image the teeth may not have attachments, may have optimal lighting conditions, and so on. The generated replacement image may have lighting, lack of attachments, lack of objects obscuring teeth, etc. as represented in the reference image, but may have the teeth, face, etc. of the image to be replaced. Similarly, the patient may have a first expression in the image to be replaced, and may have a second expression in the reference image. The generated replacement image may include the patient's teeth from the image to be replaced, but may show the second expression from the reference image. Similarly, the generated replacement image may include color information from the reference image, which may differ from color information of the image to be replaced. Similarly, the generated replacement image may include a hair style, clothing, etc. from the reference image, which may differ from hair style, clothing, etc. of the image to be replaced.

For each image to be replaced, image replacement module 273 may receive the image to be replaced and the reference image and/or an input of style information to be applied. Generated replacement images may be output to color transfer module 267 for further processing in the image processing pipeline. Alternatively, the replacement images may be input into image generation module 274 without further processing in some embodiments.

Figure 3A:
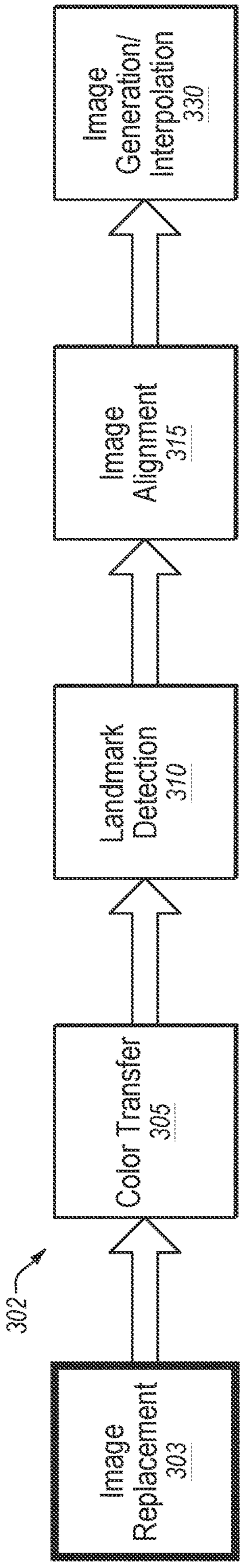
FIGS. 3A-E illustrate a flow diagram for a method of generating a video of dental treatment outcomes, in accordance with an embodiment.

FIG. 3A illustrates a flow diagram 302 for a method of generating a video of dental treatment outcomes in which an image replacement operation 303 is performed, in accordance with an embodiment. The image replacement operation may be performed by image replacement module 273 in embodiments.

Figure 4A:
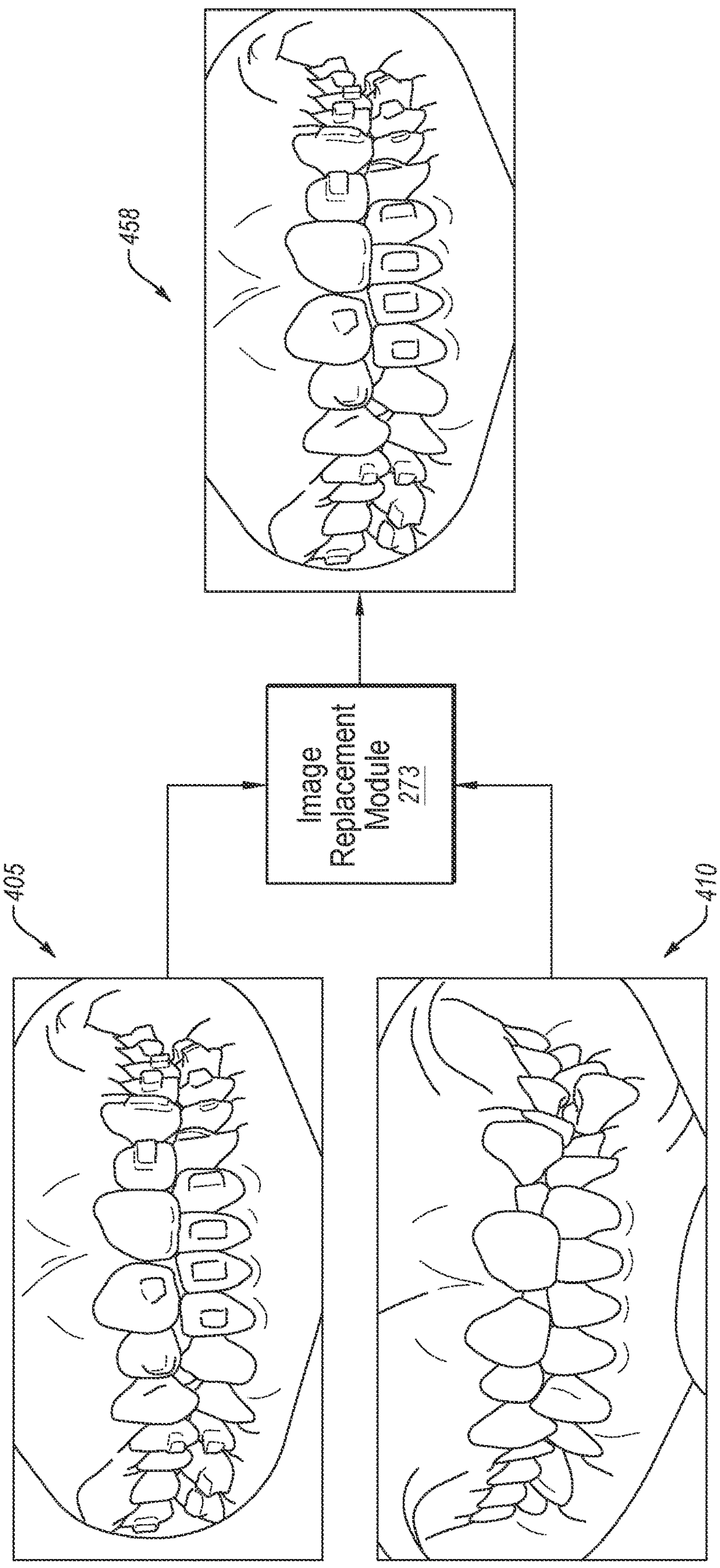
FIG. 4A illustrates example input images input into image replacement module for the image replacement operation, and an output image generated by the image replacement module, in accordance with an embodiment.

FIG. 4A illustrates example input images 405, 410 input into image replacement module 273 for the image replacement operation 303, and an output image 458 generated by the image replacement module 273, in accordance with an embodiment. In one embodiment, the image replacement module includes a StyleGAN model or other generative module that is trained to receive two input images, where a first input image (e.g., image 405) is an image to be replaced and a second input image (e.g., image 410) is an image to be used to determine style information and/or a latent space to be applied to the first input image. In one embodiment, the image replacement module 273 is trained to always apply the same style conditions to all input images. In such an embodiment, the image replacement module 273 may receive a single input image at a time, and may output a replacement for the input image. In some embodiments, image replacement module 273 generates replacement images for images that fail to satisfy one or more quality criteria. In some embodiments, image replacement module 273 generates replacement images for all images. In such an embodiment, an image quality analysis may not be performed on images prior to generating replacement images.

In some embodiments, the outputs of image replacement operation 303 are provided directly to image generation and/or interpolation operation 330, bypassing color transfer operation 305, landmark detection operation 310 and/or image alignment operation 315. For example, generated replacement images may be generated in such a way to already have color information that matches that of other images, to have an image alignment that matches that of other images, and so on. Accordingly, one or more of the color transfer operation 305, landmark detection operation 310 and/or image alignment operation 315 may be skipped for those images. Alternatively, in some embodiments replacement images are processed using color transfer operation 305, landmark detection operation 310 and/or image alignment operation 315 before being processed at image generation and/or interpolation operation 330.

Returning to FIG. 2, the captured image(s) 135 (e.g., those that satisfy the image quality assessment) and/or replacement images output by image replacement module 273 may be input into a color transfer module 267, which may include a trained neural network. The trained neural network of color transfer module 267 may be trained to adjust colors, lighting, white balance, etc. of input images. For instances in which there are multiple captured images 135 of a patient's teeth over time (e.g., at different stages of treatment), the color transfer module 267 causes each of these images to have colors, shading, white balance, etc. that is uniform across the images. The machine learning model of color transfer module 267 may output updated or modified versions of each of the input images, or instructions on how to modify the input images, which may be applied by another logic of color transfer module 267 to generate modified images that are color balanced.

Figure 3B:
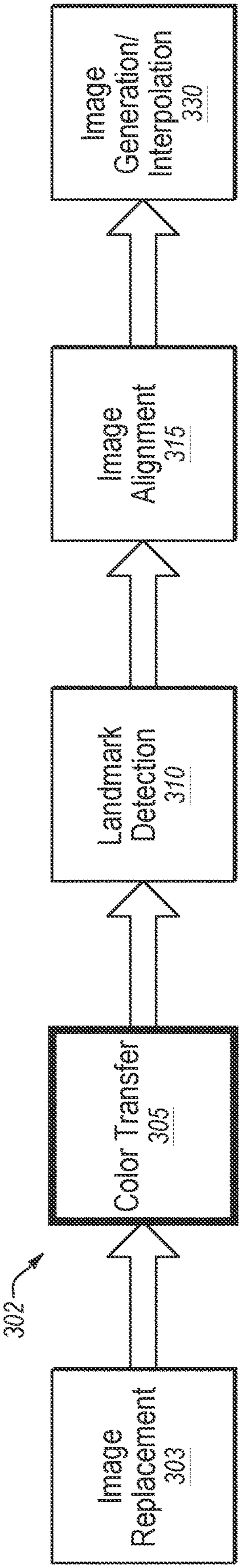

FIG. 3B illustrates the flow diagram 302 for a method of generating a video of dental treatment outcomes in which a color transfer operation 305 is performed, in accordance with an embodiment. The color transfer operation may be performed by color transfer module 267 in embodiments.

Figure 4B:
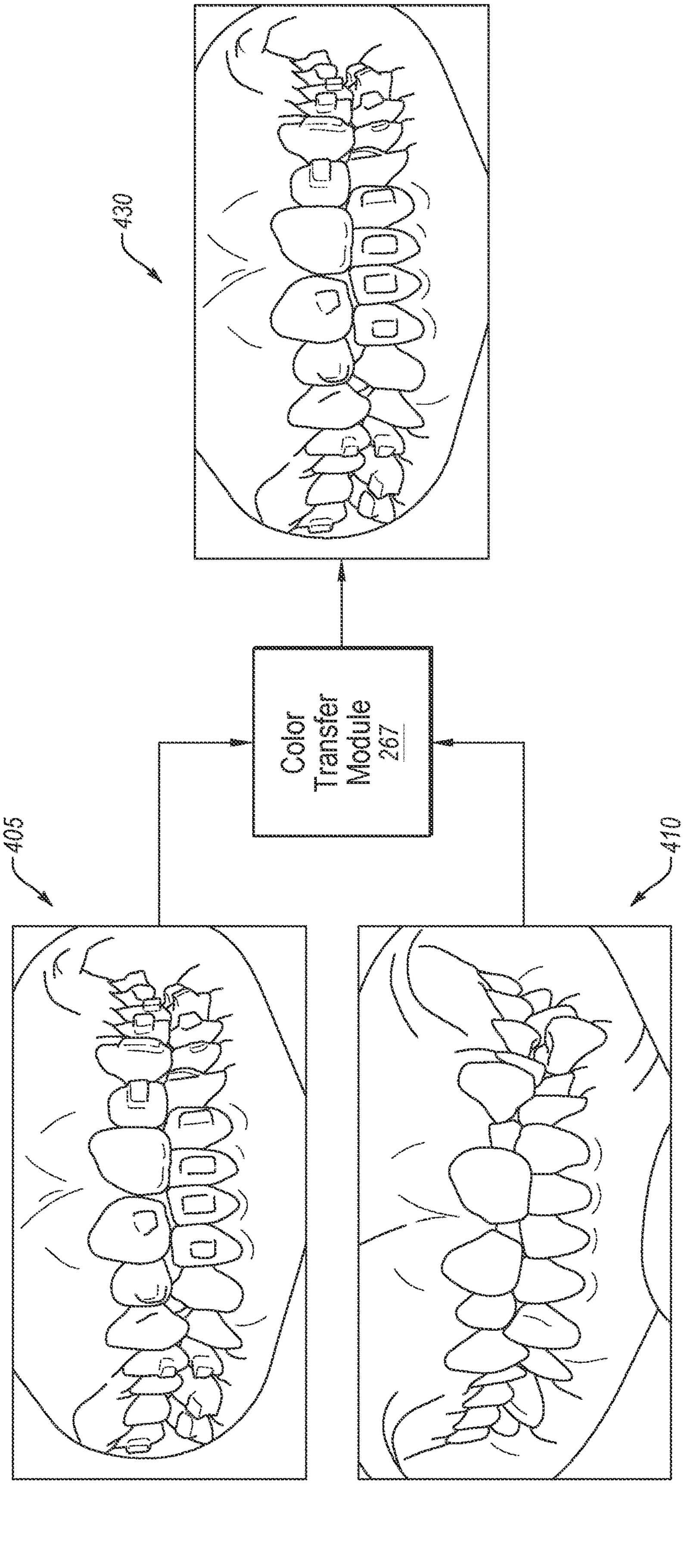
FIG. 4B illustrates example input images input into a color transfer model, and an output image generated by the color transfer model, in accordance with an embodiment.

FIG. 4B illustrates example input images 405, 410 input into color transfer module 267 (e.g., including a color transfer model) for the color transfer operation 305, and an output image 430 generated by the color transfer module 267, in accordance with an embodiment. In one embodiment, the color transfer model is trained to receive two input images, where a first input image (e.g., image 405) is an image to be modified and a second input image (e.g., image 410) is an image whose coloring and/or lighting conditions are to be applied to the first input image. In one embodiment, the color transfer model is trained to always apply the same coloring and/or lighting conditions (e.g., the same style) to all input images. In such an embodiment, the color transfer module 267 may receive a single input image at a time, and may output a modified version of the input image in which colors have been modified.

Returning to FIG. 2, after images have been modified to have a consistent color and/or lighting (e.g., consistent style), the modified images may be provided to landmark detection module 270, which may include one or more trained machine learning models. Alternatively, unmodified images may be provided to landmark detection module before or after the color transfer module 267 has operated on the images. In some embodiments, landmark detection module 270 and color transfer module 267 operate on one or more captured images in parallel.

A trained neural network of landmark detection module 270 may be trained to perform segmentation of input images. The trained neural network may segment images of faces, smiles, oral cavities, etc. into different dental objects, such as into individual teeth and/or gums. The neural network may identify multiple teeth in an image and may assign different object identifiers to each of the identified teeth. In some embodiments, the neural network estimates tooth numbers for each of the identified teeth (e.g., according to a universal tooth numbering system, according to Palmer notation, according to the FDI World Dental Federation notation, etc.). The trained neural network or another trained neural network may perform landmark detection on the images. The trained neural network (or other trained neural network) may use the tooth segmentation information to perform landmark detection in some embodiments. In some embodiments, segmentation is omitted, and landmark detection is performed without first performing segmentation of input images. In one embodiment, landmark detection includes identifying features or sets of features (e.g., landmarks) in each input image. In one embodiment, identified landmarks are one or more teeth, centers of one or more teeth, eyes, nose, and so on. The identified landmarks may be of features that are common to some or all of the input captured images 135 in embodiments. The landmark detection module 270 may output information on the locations (e.g., coordinates) of each of multiple different features or landmarks in an input image. Groups of landmarks may indicate a pose (e.g., position, orientation, etc.) of a dental arch in embodiments.

Figure 3C:
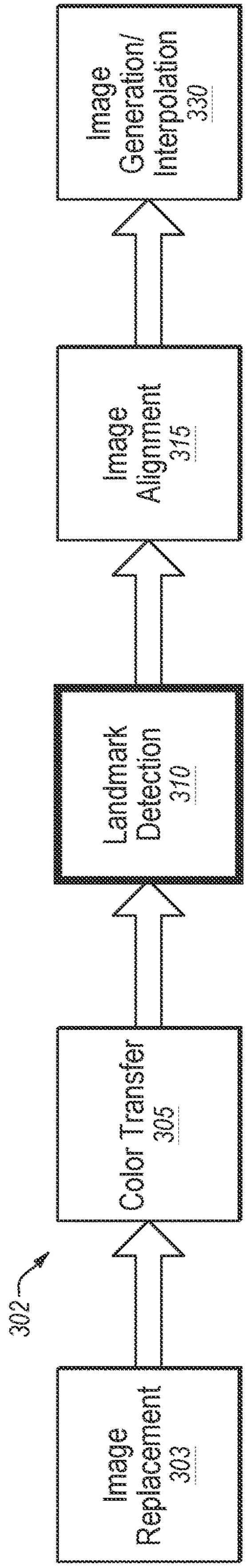

FIG. 3C illustrates the flow diagram 302 for the method of generating a video of dental treatment outcomes shown in FIG. 3B, with a landmark detection operation 310 highlighted, indicating that landmark detection may be performed after color transfer, in accordance with an embodiment. Alternatively, landmark detection may be performed before and/or during color transfer.

Figure 4C:
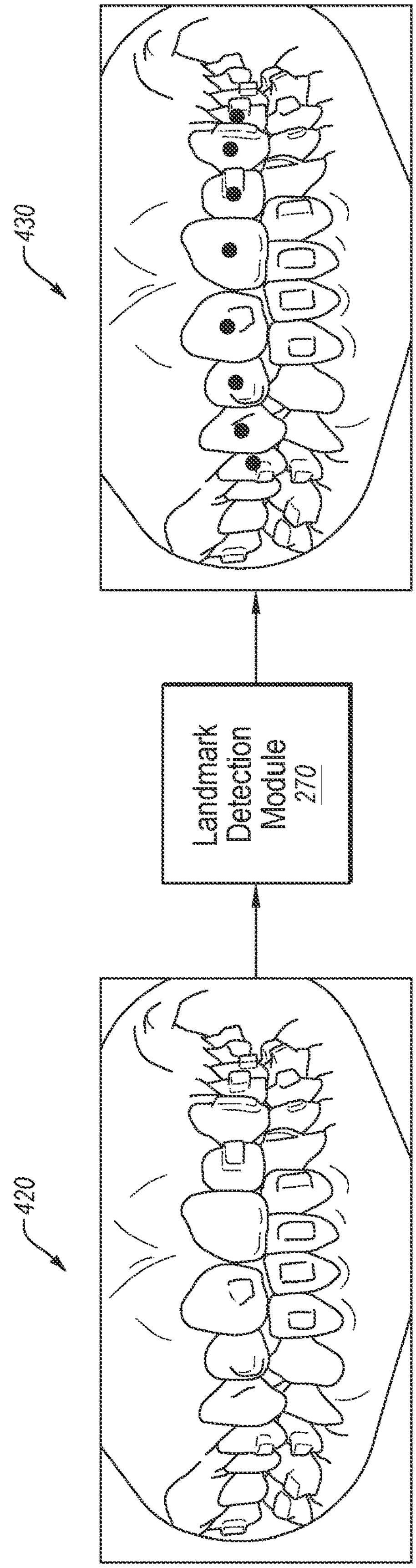
FIG. 4C illustrates an example input image input into a landmark detection model, and an output of the landmark detection model, in accordance with an embodiment.

FIG. 4C illustrates an example input image 420 input into a landmark detection module 270 (e.g., a landmark detection model), and an output 430 of the landmark detection module 270, in accordance with an embodiment. In one embodiment, the landmark detection module 270 outputs locations of one or more teeth in the input image 420. For example, the landmark detection module 270 may output locations of centers of each of one or more teeth (e.g., a front six or eight teeth) in the input image 420. In one embodiment, the input image 420 is a color balanced image (e.g., a modified image generated at the color transfer operation 305).

Returning to FIG. 2, after landmark detection has been performed for images, the images and landmark information may be provided to physical alignment module 272. In one embodiment, physical alignment module 272 includes one or more trained machine learning models trained to receive multiple input images and to generate modified versions of the input images where the output images are approximately physically aligned with each of the other input images. In one embodiment, physical alignment module 272 does not include any machine learning models. In one embodiment, physical alignment module operates on pairs of input images (e.g., pairs of images that are sequential in time). Physical alignment module 272 may compute affine transformations between each pair of input images. This may include estimating scale, rotation and/or translation between a first set of 2D points from a first image of the pair of input images and a second set of 2D points from a second image of the pair of input images. In embodiments, the affine transformations can be computed using a least squares technique to compute a transformation matrix. For two images having given point sets p1 and p2, where each point set includes i points, an affine transformation S, R, T may be selected such that $\Sigma\|S\cdot R\cdot p_{1,i}+T-p_{2,i}\|^2$ is minimized, where T represents an amount of translation, S represents a scale matrix, and R represents a rotation matrix. The computed affine transformations may then be applied to one or more of the input images (e.g., by performing an affine warp) to cause the two images to be approximately aligned in space.

Figure 3D:
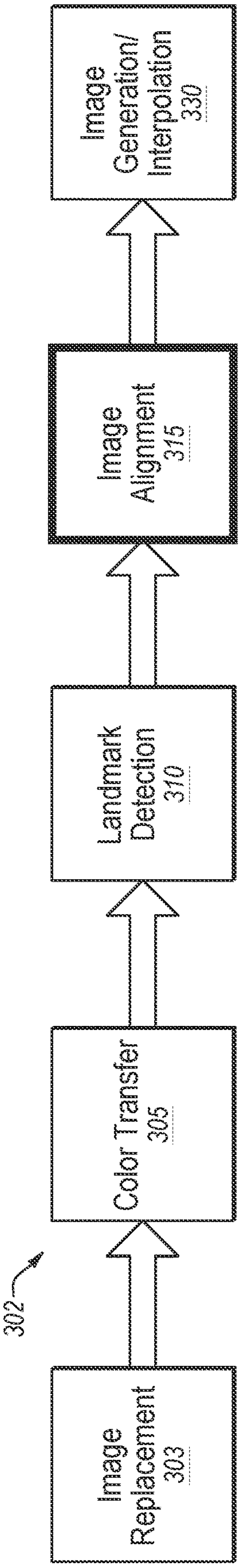

FIG. 3D illustrates flow diagram 302 for the method of generating a video of dental treatment outcomes in which an image alignment operation 315 is highlighted, in accordance with an embodiment.

Figure 4D:
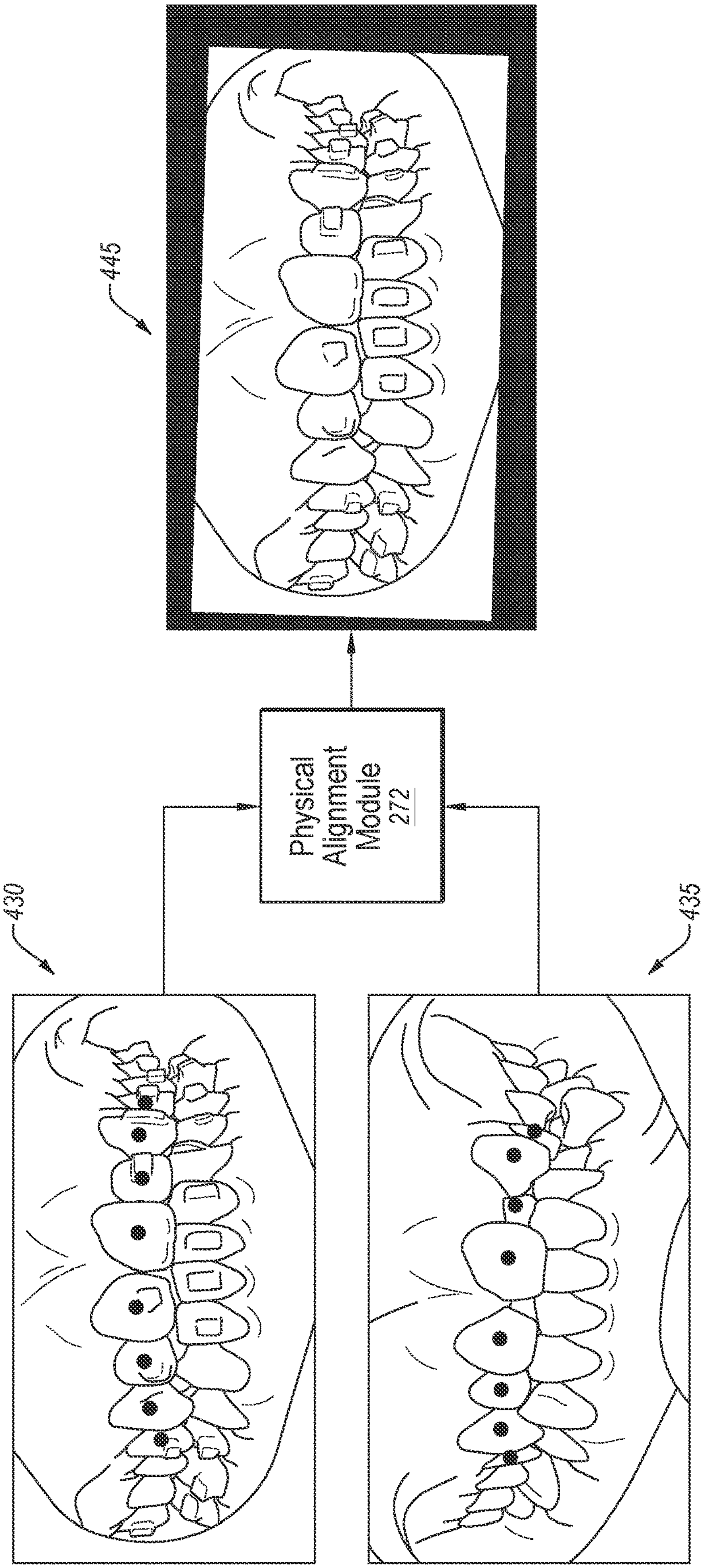
FIG. 4D illustrates example input images with identified landmarks input into an affine transformation model, and a modified image to which one or more determined affine transformations have been applied, in accordance with an embodiment.

FIG. 4D illustrates example input images 430, 435 with identified landmarks input into a physical alignment module 272 (e.g., which may compute an affine transformation matrix and perform an affine warp of one or more of the input images using the affine transformation matrix), which outputs one or more modified images 445 that are aligned with one another, in accordance with an embodiment.

Returning to FIG. 2, once image alignment has been performed for images, the images may have approximately uniform coloring and lighting, and may also have approximately uniform spatial alignment, rotation, camera viewpoint, pose, size, and so on. Additionally, generated replacement images output by image replacement module 273 may be generated to have a spatial alignment, rotation, size, camera viewpoint, pose, etc., that are aligned with these image features of the other images. This enables the images to be shown one after another in sequence (e.g., as frames of a video) without jittery behavior, abrupt changes in position, abrupt changes in coloration, etc. between frames. However, depending on the frequency with which the captured images 135 were generated, there may be large frame motion between subsequent images/frames, which may still cause some jerkiness and/or abrupt transitions between one or more images. Accordingly, in embodiments an image generation module 274 receives the physically aligned images and processes those images to generate additional simulated images that are interpolated images showing intermediate versions of a patient's dentition between the captured images 135. Image generation module 274 may operate on pairs of sequential in time images (e.g., a first in time image and a second in time image) and generate one or more simulated images that depict an intermediate state between the first in time image and the second in time image. This may be performed for each pair of sequential images.

Figure 3E:
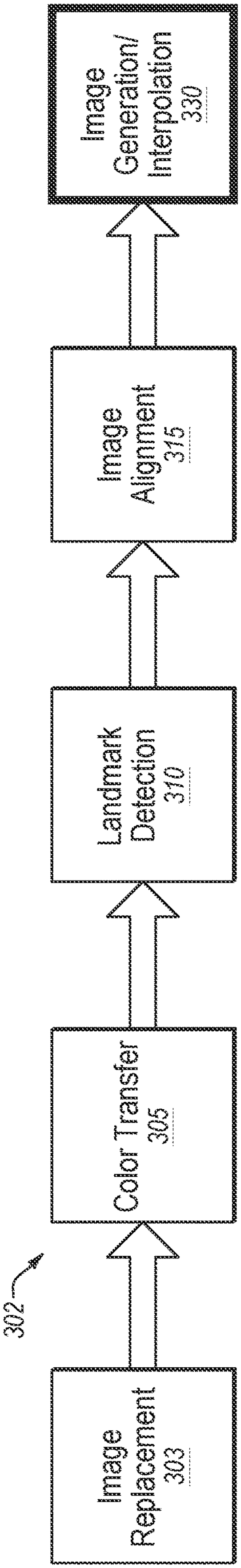

FIG. 3E illustrates flow diagram 302 for the method of generating a video of dental treatment outcomes in which an image generation operation 320 is highlighted, in accordance with an embodiment.

Figure 4E:
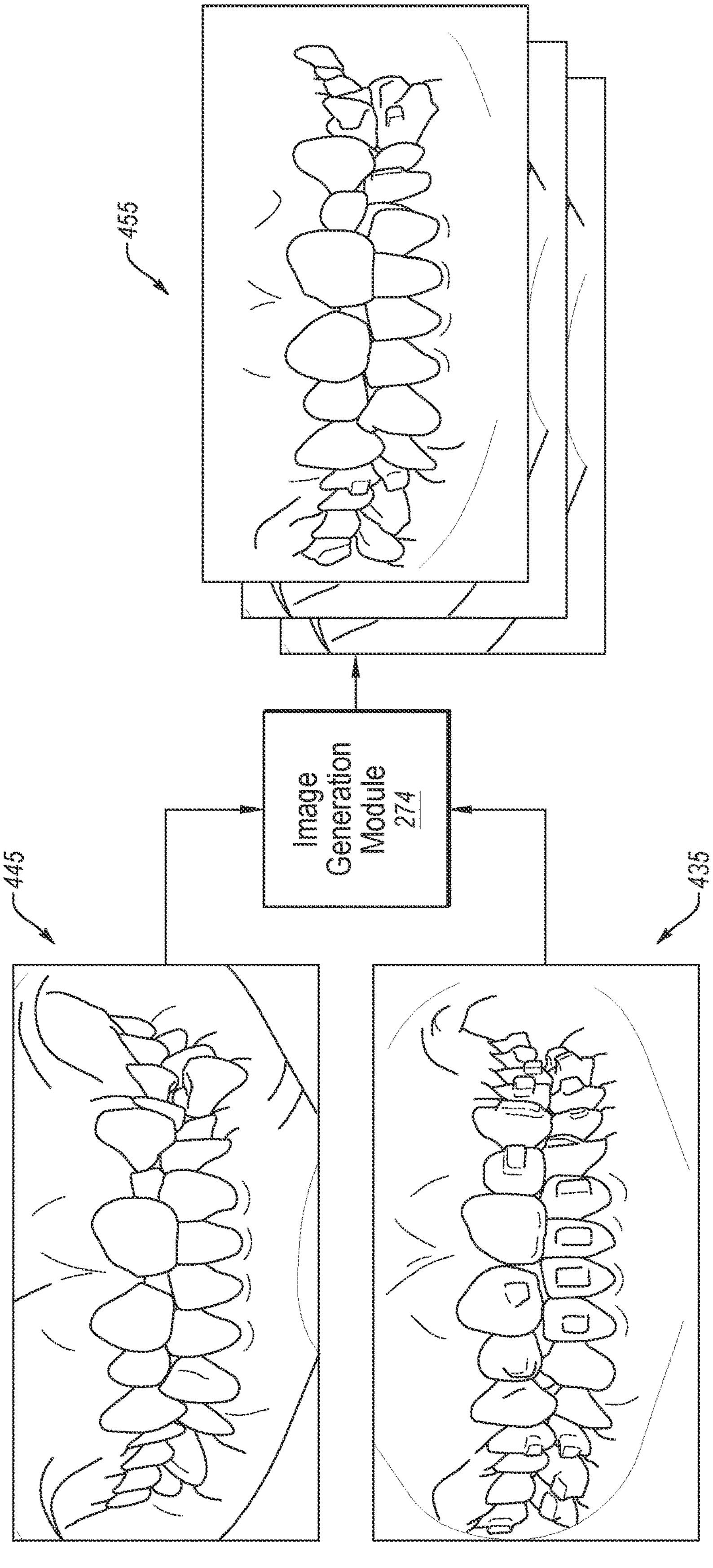
FIG. 4E illustrates example input images input into an image generation model, and an output image of the image generation model, in accordance with an embodiment.

FIG. 4E illustrates example input images 445, 435 input into an image generation module 274, and one or more output image 455 of the image generation module 274, in accordance with an embodiment. Multiple different techniques may be applied to generate simulated images in embodiments, which may or may not rely on trained machine learning models.

In one embodiment, image generation module 274 computes an optical flow between the input images 445, 435, and generates simulated image 455 based on the optical flow. In one embodiment, a generative model is used to generate intermediate images. The generative model may receive two input images and may generate an output image that shows an intermediate state between the two input images. In one embodiment, the generative model is a generative model that includes one or more layers that determine features of each of the input images in a feature space and one or more layers that compute an optical flow of the features in the feature space. The optical flow may include, for each pair of points between the first features and the second features, a vector indicating a direction of movement and a magnitude of movement for the features between the images. The generative model may then use the optical flow in the feature space to generate a simulated image that is an interpolation between the two input images. Such a generated image may be more accurate than a simulated image generated using a simple generative model or a simple optical flow.

Returning to FIG. 2, image generation performed by image generation module 274 may be performed recursively. For example, a first simulated image may be interpolated between a first and second image, and then a second simulated image may be interpolated between the first image and the first interpolated image and and/or a third simulated image may be interpolated between the first simulated image and the second image. Such recursion may be performed until one or more stopping criteria are satisfied. For example, simulated images may be generated until a newly generated image has a similarity score to the input images used to generate the newly simulated image that exceeds a similarity threshold. In another example, key points (e.g., landmarks) between two images may be used to compute a movement score, and if the movement score is below a threshold then additional simulated images may not be generated. Additionally the movement score can incorporate details from the treatment plan, such as projected 2D displacement and other metrics defined in the treatment plan. In one embodiment, processing logic determines a movement score between two images based on an amount of movement between key points in the two images, and a number of recursions to be performed is determined based on the movement score.

Figure 5A:
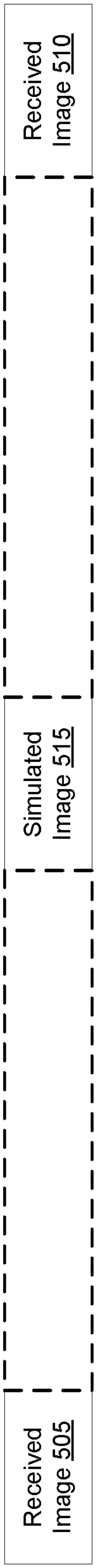
FIGS. 5A-C illustrate various stages of a recursive synthetic image generation process used in embodiments to create a video (e.g., of dental treatment over time), in accordance with an embodiment.
Figure 5B:
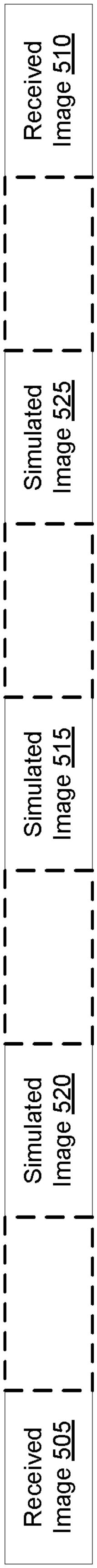
Figure 5C:
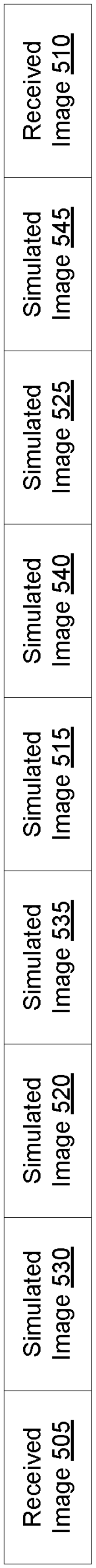

FIGS. 5A-C illustrate various stages of a recursive synthetic image generation process used in embodiments to create a video (e.g., of dental treatment over time), in accordance with an embodiment. FIG. 5A shows generation of a simulated image 515 that is an interpolation of received image 505 and received image 510. FIG. 5B illustrates a first recursion of the image generation process, in which simulated image 520 is an interpolation of received image 505 and simulated image 515, and in which simulated image 525 is an interpolation of simulated image 515 and received image 510. FIG. 5C illustrates a second recursion of the image generation process, in which simulated image 530 is an interpolation of received image 505 and simulated image 520, simulated image 535 is an interpolation of simulated image 530 and simulated image 515, simulated image 540 is an interpolation of simulated image 515 and simulated image 525, and simulated image 545 is an interpolation of simulated image 525 and received image 510. The recursions could potentially continue until some stopping criterion is met.

There may be different amounts of movement to key points between different pairs of images and/or there may be more time that lapsed between the capturing of some pairs of images than other pairs of images. Accordingly, more recursions of the image generation process may be performed between some images than between others.

Figure 5D:
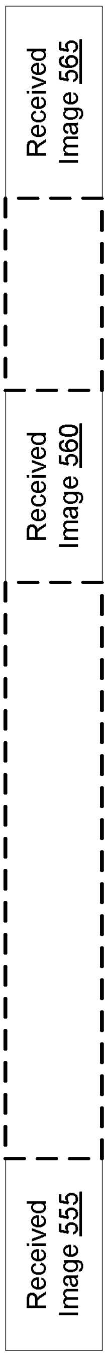
FIGS. 5D-F illustrate various stages of a recursive synthetic image generation process used in embodiments to create a video (e.g., of dental treatment over time), in accordance with an embodiment.
Figure 5E:
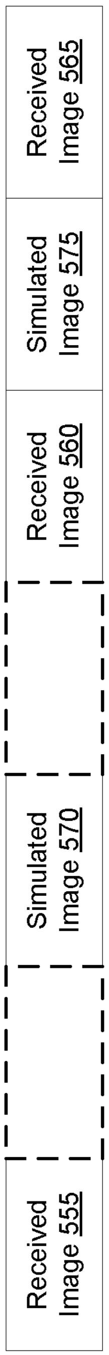
Figure 5F:
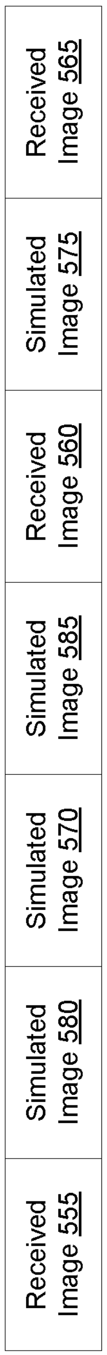

FIGS. 5D-F illustrate various stages of a recursive synthetic image generation process used in embodiments to create a video (e.g., of dental treatment over time), in accordance with an embodiment. As shown in FIG. 5D, three images were captured at different times, including received image 555, received image 560 and received image 565. The similarity between received image 560 and received image 565 may be much closer than the similarity between received image 555 and received image 560, as an example. As shown in FIG. 5E, an image generation process may be performed to generate simulated image 570 that is an interpolation between received image 555 and received image 560, and to generate simulated image 575 that is an interpolation between received image 560 and received image 565. After the image generation process, simulated image 575 may be sufficiently similar to received image 560 and/or received image 565 that no further simulated images between received image 560 and received image 565 are generated. However, received image 555 and received image 560 may be different enough from simulated image 570 as to fail some similarity criterion. Accordingly, a recursion of the image generation process may be performed to generate additional simulated image 580 that is an interpolation of received image 555 and simulated image 570, and to generate additional simulated image 585 that is an interpolation of simulated image 570 and received image 560. After the recursion, there may be sufficient similarity between sequential images (e.g., between received image 555 and simulated image 580, between simulated image 580 and simulated image 570, etc.) to forego additional recursions of the image generation operation.

Returning to FIG. 2, once all simulated images have been generated, the simulated images and physically aligned (and color blended) captured images may be input into a video generation module 276. Video generation module 276 may then generate a video (e.g., smile video 278) including each of the received images, where each of the images may be a frame of the video. The images may be arranged sequentially from an earliest in time image to a latest in time image, with simulated images interposed between captured images. A viewer (e.g., doctor and/or patient) may then view the smile video 278 to see the progression of a state of their dentition over time (e.g., to see the progression of dental treatment across one or more stages of treatment).

In some embodiments, a patient and/or doctor may wish to view a video of dental treatment before dental treatment has begun and/or at an intermediate stage of dental treatment. In such instances, it can be useful to generate a smile video that projects the state of the patient's dentition into the future. If dental treatment has not yet begun, then the smile video 278 can be generated using a single captured image of a current state of the patient's dentition and a treatment plan. If treatment has begun, then captured images of stages of treatment up until present may be used to generate a portion of a smile video from a start of treatment to present, and a latest image of the patient's dentition and a treatment plan may be used to generate a portion of the smile video that estimates what the patient's dentition will look like at various future stages of treatment. If treatment has not yet begun, then the operations of color transfer module 267, landmark detection module 270 and physical alignment module 272 may be omitted.

To generate a smile video that incorporates simulated future images of an individual's dentition, one or more operations may be performed by image generation module 280, image generation module 274 and video generation module 276. Image generation module 280 may receive one or more captured images 135 of a current state or most recent state of an individual's dentition. The image generation module 280 may additionally receive a treatment plan 158 and/or components of a treatment plan such as a 3D model of the patient's current dentition and/or 3D models of predicted future states of the patient's dentition at future stages of treatment. This may include a 3D model of a final state of the patient's teeth and/or intermediate states of the patient's teeth at various intermediate stages of dental treatment (e.g., orthodontic and/or restorative treatment). Image generation module 280 may then generate, for each stage of treatment that has an associated 3D model, a simulated image of the patient's dentition at that stage of treatment.

In one embodiment, to generate a simulated post-treatment image simulated image of a stage of treatment, image generation module 280 generates a color map from a captured image 135. This may include determining one or more blurring functions based on a captured image 135. This may include setting up the functions, and then solving for the one or more blurring functions using data from an initial pre-treatment captured image 135. In some embodiments, a first set of blurring functions is generated (e.g., set up and then solved for) with regards to a first region depicting teeth in the captured image 135 and a second set of blurring functions is generated with regards to a second region depicting gingiva in the captured image 135. Once the blurring functions are generated, these blurring functions may be used to generate a color map. Abstract representations such as a color map, image data such as sketches obtained from the 3D model of the dental arch at a stage of treatment (e.g., from a 3D mesh from the treatment plan) depicting contours of the teeth and gingiva post-treatment or at an intermediate stage of treatment and/or a normal map depicting normal of surfaces from the 3D model may be input into a generative model that then uses such information to generate a post-treatment image of a patient's face and/or teeth.

In embodiments, the blurring functions for the teeth and/or gingiva are global blurring functions that are parametric functions. Examples of parametric functions that may be used include polynomial functions (e.g., such as biquadratic functions), trigonometric functions, exponential functions, fractional powers, and so on. In one embodiment, a set of parametric functions are generated that will function as a global blurring mechanism for a patient. The parametric functions may be unique functions generated for a specific patient based on an image of that patient's smile. With parametric blurring, a set of functions (one per color channel of interest) may be generated, where each function provides the intensity, I, for a given color channel, c, at a given pixel location, x, y according to the following equation:

$$I_c(x, y) = \int (x, y) \tag{1}$$

A variety of parametric functions can be used for f. In one embodiment, a parametric function is used, where the parametric function can be expressed as:

$$I_c(x, y) = \sum_{i=0}^{N} \sum_{j=0}^{i} w(i, j) x^{i-j} y^j \tag{2}$$

In one embodiment, a biquadratic function is used. The biquadratic can be expressed as:

$$I_c(x, y) = w_0 + w_1 x + w_2 y + w_3 xy + w_4 x^2 + w_5 y^2 \tag{3}$$

Where $w_0, w_1, \ldots, w_5$ are weights (parameters) for each term of the biquadratic function, x is a variable representing a location on the x axis and y is a variable representing a location on the y axis (e.g., x and y coordinates for pixel locations, respectively).

The parametric function (e.g., the biquadratic function) may be solved using linear regression (e.g., multiple linear regression). Some example techniques that may be used to perform the linear regression include the ordinary least squares method, the generalized least squares method, the iteratively reweighted least squares method, instrumental variables regression, optimal instruments regression, total least squares regression, maximum likelihood estimation, rigid regression, least absolute deviation regression, adaptive estimation, Bayesian linear regression, and so on.

To solve the parametric function, a mask M of points may be used to indicate those pixel locations in the initial image that should be used for solving the parametric function. For example, the mask M may specify some or all of the pixel locations that represent teeth in the image if the parametric function is for blurring of teeth or the mask M may specify some or all of the pixel locations that represent gingiva if the parametric function is for the blurring of gingiva.

In an example, for any initial image and mask, M, of points, the biquadratic weights, $w_0, w_1, \ldots, w_5$, can be found by solving the least squares problem:

$$Aw^T = b \text{ where:} \tag{4}$$

$$w = [w_0, w_1, w_2, w_3, w_4, w_5] \tag{5}$$

$$A = \begin{bmatrix} 1 & x_0 & y_0 & x_0y_0 & x_0^2 & y_0^2 \\ 1 & x_1 & y_1 & x_1y_1 & x_1^2 & y_1^2 \\ \vdots & \vdots & \vdots & \vdots & \vdots & \vdots \\ 1 & x_n & y_n & x_ny_n & x_n^2 & y_n^2 \end{bmatrix}; \forall x_i, y_i \in M \tag{6}$$

$$b = \begin{bmatrix} I_c(x_0, y_0) \\ I_c(x_1, y_1) \\ \vdots \\ I_c(x_n, y_n) \end{bmatrix}; \forall x_i, y_i \in M \tag{7}$$

By constructing blurring functions (e.g., parametric blurring functions) separately for the teeth and the gum regions, a set of color channels can be constructed that avoid any pattern of dark and light spots that may have been present in the initial image as a result of shading (e.g., because one or more teeth were recessed).

In embodiments, the blurring functions for the gingiva are local blurring functions such as Gaussian blurring functions. A Gaussian blurring function in embodiments has a high radius (e.g., a radius of at least 5, 10, 20, 40, or 50 pixels). The Gaussian blur may be applied across the mouth region of the initial image in order to produce color information. A Gaussian blurring of the image involves convolving a two-dimensional convolution kernel over the image and producing a set of results. Gaussian kernels are parameterized by σ, the kernel width, which is specified in pixels. If the kernel width is the same in the x and y dimensions, then the Gaussian kernel is typically a matrix of size 6σ+1 where the center pixel is the focus of the convolution and all pixels can be indexed by their distance from the center in the x and y dimensions. The value for each point in the kernel is given as:

$$G(x, y) = \frac{1}{2\pi\sigma^2} e^{-\frac{x^2+y^2}{2\sigma^2}} \tag{8}$$

In the case where the kernel width is different in the x and y dimensions, the kernel values are specified as:

$$G(x, y) = G(x)G(y) = \frac{1}{2\pi\sigma_x\sigma_y} e^{-\left(\frac{x^2}{2\sigma_x^2}+\frac{y^2}{2\sigma_y^2}\right)} \tag{9}$$

In some embodiments, neural networks, such as generative networks, generative adversarial networks (GANs), conditional GANs or picture to picture GANs may be used to generate a simulated image of a smile having teeth in a final or intermediate treatment position. The neural network may integrate data from a 3D model of an upper and/or lower dental arch associated with the stage of treatment with a blurred version of the captured image 135 (which is a color image). The blurred color image (e.g., a color map) of the patient's smile may be generated by applying one or more generated blurring functions to the data from the 3D model. The data may be received as 3D data or as 2D data (e.g., as a 2D view of a 3D virtual model of the patient's dental arch). The neural network may use the input data to generate a simulated post-treatment image that matches the colors, tones, shading, etc. from the blurred color image with the shape and contours of the teeth and gingiva from the post treatment image data (e.g., data from the 3D model).

After training, the neural network receives inputs for use in generating a realistic rendering of the patient's teeth in a clinical final and/or intermediate position. In order to provide color information to the generative model, a blurred color image (e.g., color map) that represents a set of color channels is provided along with a post-treatment or mid-treatment sketch of teeth and/or gingiva for a patient. In embodiments, a normal map comprising normals to surfaces of the post-treatment 3D model may also be generated and provided to the trained generative model. The color channels are based on the initial photo and contain information about the color and lighting of the teeth and gums in that initial image. In order to avoid sub-optimal results from the generative model, no structural information (e.g., tooth location, shape, etc.) remains in the blurred color image in some embodiments.

As discussed above, the inputs may include a color map of the patient's teeth and gingiva as well as an image (e.g., a sketch or outline) of teeth and/or gingiva in a clinical target position (e.g., a 2D rendering of a 3D model of the patient's teeth in the clinical target position) of the patients teeth and/or a normal map of the post-treatment teeth in the clinical target position, and so on. The clinical target position may have been determined, for example, according to treatment plan 158.

The neural network uses the inputs and a set of trained model parameters to render a realistic image of the patient's teeth in a target position. This photo realistic image may then be integrated into the mouth opening of the captured image 135 and an alpha channel blurring may be applied. In embodiments, image generation module 280 performs the operations set forth in U.S. application Ser. No. 16/041,613, filed Jul. 20, 2018, to generate a simulated image. U.S. application Ser. No. 16/041,613, filed Jul. 20, 2018, is incorporated herein in its entirety. In embodiments, image generation module 280 performs the operations set forth in U.S. application Ser. No. 16/579,673, filed Sep. 23, 2019, to generate a simulated image. U.S. application Ser. No. 16/579,673, filed Sep. 23, 2019, is incorporated herein in its entirety.

Once one or more simulated images are generated by image generation module 280, the simulated images and one or more captured images 135 may be input into image generation module 274. Image generation module may then perform the above described operations to generate additional simulated images that are interpolated images between the captured image and/or simulated images generated by image generation module 280.

Video generation module 276 may use data from image generation module 280 and/or image generation module 274 to generate a video showing future stages of dental treatment. Video generation module 276 may merge a video showing future stages of dental treatment with another video showing previous stages of dental treatment (e.g., as generated based on operations performed by color transfer module 267, landmark detection module 270, physical alignment module 272 and image generation module 274). In some embodiment, a first visualization or other indicator is used to indicate which images or frames of the video represent past states of the patient's dentition and a second visualization or other indicator is used to indicate which images or frames of the video represent predicted future states of the patient's dentition. For example, different borders may be used to differentiate between past images and future images.

FIGS. 6A-9 below describe methods associated with generating simulated videos of a patient's smile, in accordance with embodiments of the present disclosure. The methods depicted in FIGS. 6A-9 may be performed by a processing logic that may comprise hardware (e.g., circuitry, dedicated logic, programmable logic, microcode, etc.), software (e.g., instructions run on a processing device), or a combination thereof. Various embodiments may be performed by a computing device 105 as described with reference to FIG. 1 and/or by a computing device 1000 as shown in FIG. 10.

Figure 6A:
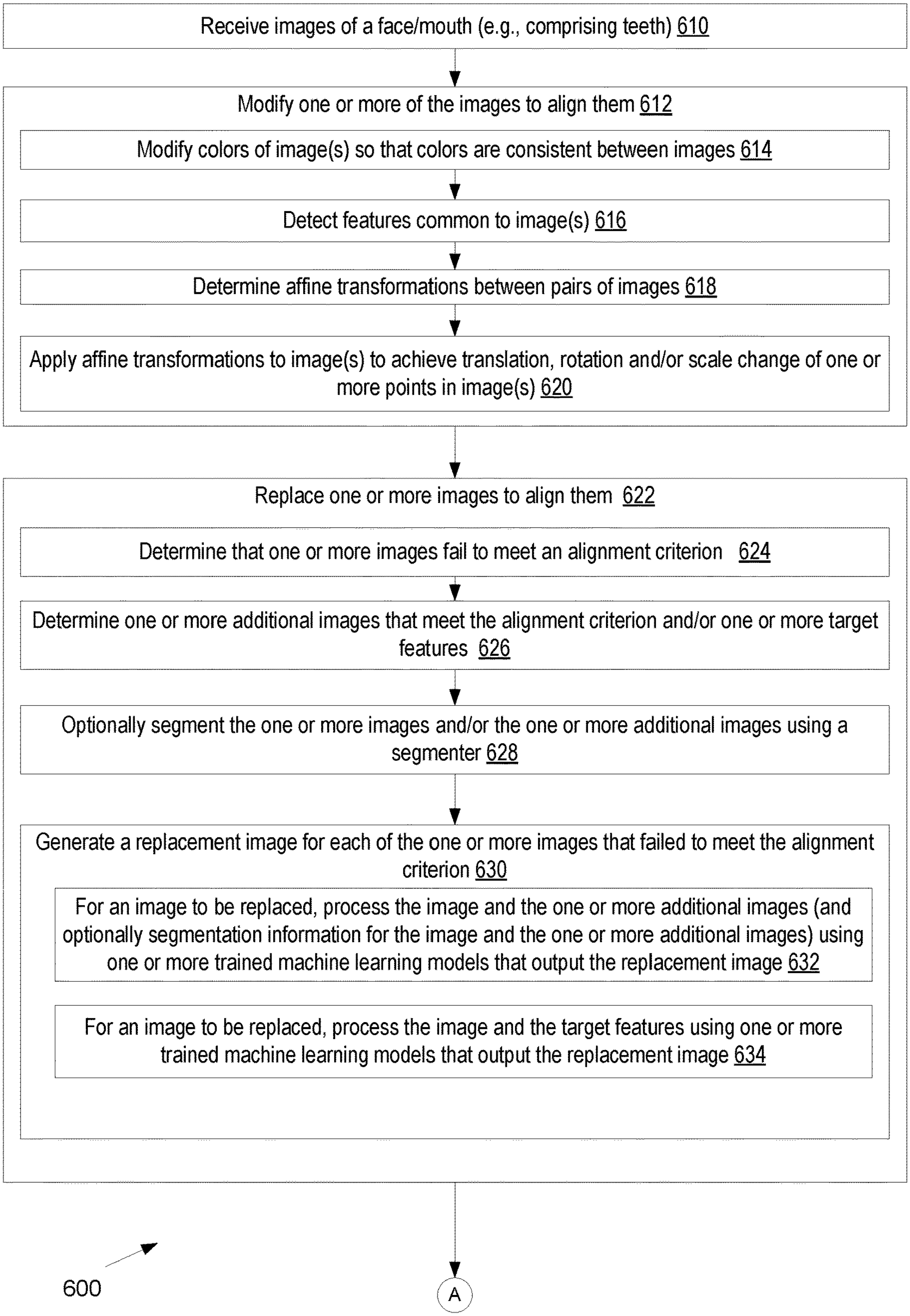
FIGS. 6A-B illustrate a flow diagram for a method of generating video of dental treatment over time after treatment has begun, in accordance with an embodiment.
Figure 6B:
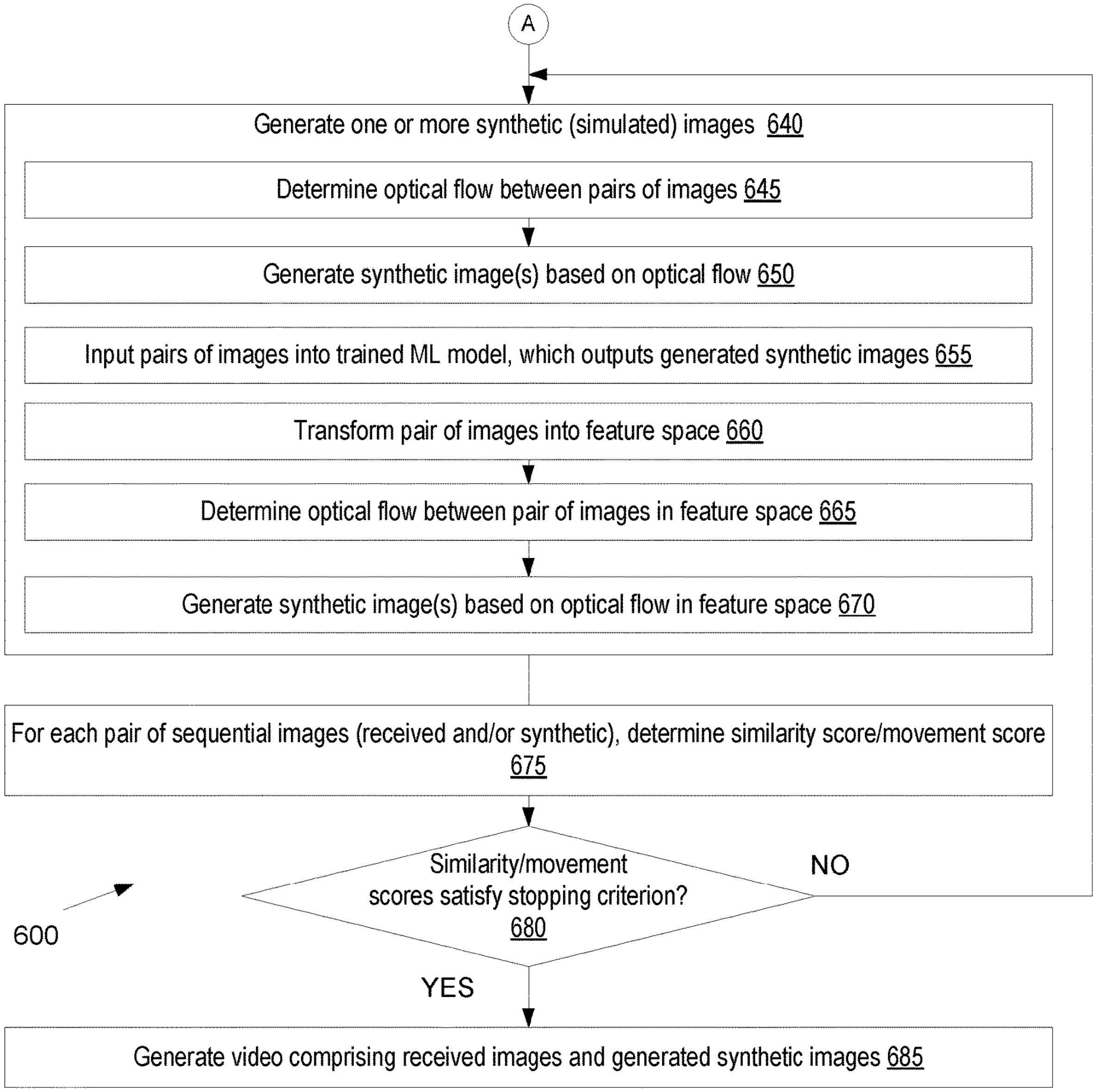

FIGS. 6A-B illustrate a flow diagram for a method 600 of generating video of dental treatment over time after treatment has begun, in accordance with an embodiment. At block 610 of method 600, processing logic receives multiple images of a face, teeth and/or mouth of an individual (e.g., of a patient or person). The images may be of a patient smiling, and may show the patient's teeth, gums, lips, and so on. In some embodiments, the images are of the patient's full head and/or shoulders. In some embodiments, the images are of just a face of the patient. In some embodiments, the images are of the patient's teeth, and do not show the patient's face, or only show a small region of the patient's face.

At block 612, processing logic may modify one or more of the images to align the images. In one embodiment, at block 614 processing logic modifies colors of the images so that the colors are consistent between the images (e.g., to align the colors of the images). At block 616, processing logic determines features that are common to some or all of the images (e.g., by performing segmentation and/or landmark detection). At block 618, processing logic determines affine transformations (or optionally other types of transformations) between pairs of the images (e.g., between sequential images). At block 620, processing logic applies the respective affine transformations (or other transformations) to one or more of the images to achieve translation of the images, rotation of the images, and/or scale change of the images.

At block 622, processing logic may replace one or more images with one or more replacement images that can be aligned with other images. In some embodiments, at block 624 received images are assessed to determine whether the images satisfy one or more quality criteria (e.g., alignment criteria). Quality criteria may include blur criteria, a camera viewpoint and/or face pose criterion, a lighting criterion, a facial expression criterion, an exposed teeth criterion, and so on. Images that fail to satisfy the one or more quality criteria may be replaced in embodiments. Alternatively, all images may be replaced. Alternatively, images that fail to satisfy one or more image quality criteria may be discarded.

In one embodiment, at block 626 one or more images that satisfy one or more image quality (e.g., alignment) criteria are determined. Such a determined image may be used as a reference image in embodiments. In some embodiments, one or more target features (e.g., style properties) may be selected and provided to processing logic. In some embodiments, processing logic automatically determines one or more target features (e.g., style properties) from an assessment of received images. At block 628, processing logic may optionally segment the one or more images and/or the one or more additional images using a segmenter (e.g., a machine learning model trained to perform image segmentation on images of faces). The segmenter may segment input images into teeth, gums, lips, facial features, and so on in embodiments.

At block 630, processing logic may generate a replacement image for each of the one or more images that failed to meet the one or more image quality criteria. In one embodiment, at block 632 an image to be replaced and a reference image are input into a trained generative model. In some embodiments, segmentation information for both of the images is also input into the trained generative model. The trained generative model may then generate a replacement image using the features of the image to be replaced (e.g., teeth, etc.) and style information from the reference image. For example, the replacement image may have the teeth of the image to be replaced, but in a pose provided by the reference image. The replacement image may include synthetically generated data for one or more teeth that were not visible in the image to be replaced. The replacement image may additionally include a facial expression from the reference image, lighting from the reference image, a lack of obstructing objects from the reference image, a lack of tooth attachments from the reference image, and so on, even though the image to be replaced may have had a different facial expression, a different lighting, may have included obstructing objects in front of one or more teeth, may have included tooth attachments, and so on. In one embodiment, at block 634 the image to be replaced is input into the generative model together with one or more selected features (e.g., selected style properties). The selected features (e.g., style properties) may be used to generate the replacement image in some embodiments.

At block 640, processing logic generates one or more simulated or synthetic images. In one embodiment at block 645 processing logic determines an optical flow between each pair of sequential images, and then at block 650 the optical flows are used to generate synthetic images that show an intermediate state between the pair of sequential images. In one embodiment, at block 655 processing logic inputs the pairs of images into a trained machine learning model (e.g., a generative model), which outputs a synthetic image for each pair of input images. In one embodiment, the generative model includes a layer that generates a set of features in a feature space for each image in a pair of images, and then determines an optical flow between the set of features in the feature space and uses the optical flow in the feature space to generate a synthetic image. In one embodiment, processing logic transforms each pair of images into a feature space at block 660, determines an optical flow between each pair of images in the feature space at block 665, and generates, for each pair of images, a synthetic image based on the optical flow in the feature space at block 670.

In one embodiment, at block 675 processing logic determines, for each pair of sequential images (which may include a received image, a replacement image, and/or a simulated image), a similarity score and/or a movement score. At block 680, processing logic may then determine whether the similarity score and/or movement score satisfies a stopping criterion. If for any pair of images a stopping criterion is not met, then the method returns to block 640 and one or more additional simulated images are generated. If all pairs of images satisfy the one or more stopping criteria, then the method continues to block 685. At block 685, processing logic generates a video (e.g., a smile video) comprising received images and generated synthetic images.

Figure 7:
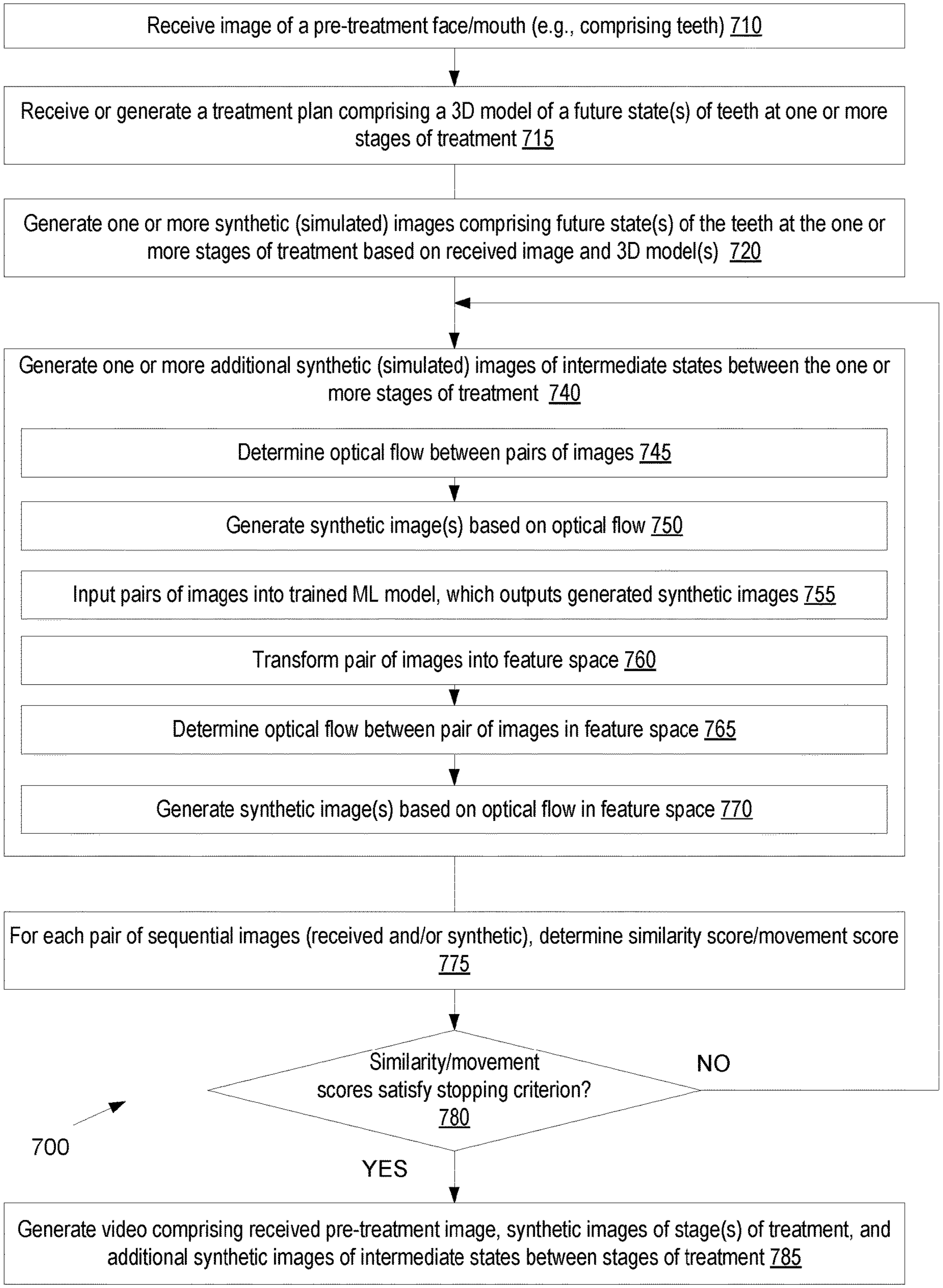
FIG. 7 illustrates a flow diagram for a method of generating video of dental treatment over time before treatment has begun, in accordance with an embodiment.

FIG. 7 illustrates a flow diagram for a method 700 of generating video of dental treatment over time before treatment has begun, in accordance with an embodiment. At block 710 of method 700, processing logic receives one or more images of a face and/or mouth of an individual (e.g., of a patient or person). The image(s) may be of a patient smiling, and may show the patient's teeth, gums, lips, and so on.

At block 715, processing logic receives or generates a treatment plan comprising a 3D model of one or more future states of the patient's teeth at one or more stages of treatment. In one embodiment, the treatment plan is a detailed and clinically accurate treatment plan generated based on a 3D model of a patient's dental arches as produced based on an intraoral scan of the dental arches. Such a treatment plan may include 3D models of the dental arches at multiple stages of treatment. In one embodiment, the treatment plan is a simplified treatment plan that includes a rough 3D model of a final target state of a patient's dental arches, and is generated based on one or more 2D images of the patient's current dentition (e.g., an image of a current smile of the patient). At block 720, processing logic generates one or more synthetic images comprising future state(s) of the teeth at one or more stages of treatment based on the received image and the 3D model(s). This may include projecting the 3D model(s) onto a 2D plane to generate a 2D projection or sketch of the 3D model(s), and then processing the 2D sketch and a blurred version of the received image(s) into a generative model that outputs the simulated image(s).

At block 740, processing logic generates one or more additional simulated or synthetic images. In one embodiment at block 745 processing logic determines an optical flow between each pair of sequential images, and then at block 750 the optical flows are used to generate synthetic images that show an intermediate state between the pair of sequential images. In one embodiment, at block 755 processing logic inputs the pairs of images into a trained machine learning model (e.g., a generator of a GAN), which outputs a synthetic image for each pair of input images. In one embodiment, the GAN includes a layer that generates a set of features in a feature space for each image in a pair of images, and then determines an optical flow between the set of features in the feature space and uses the optical flow in the feature space to generate a synthetic image. In one embodiment, processing logic transforms each pair of images into a feature space at block 760, determines an optical flow between each pair of images in the feature space at block 765, and generates, for each pair of images, a synthetic image based on the optical flow in the feature space at block 770.

In one embodiment, at block 775 processing logic determines, for each pair of sequential images, a similarity score and/or a movement score. At block 780, processing logic may then determine whether the similarity score and/or movement score satisfies a stopping criterion. If for any pair of images a stopping criterion is not met, then the method returns to block 740 and one or more additional simulated images are generated. If all pairs of images satisfy the one or more stopping criteria, then the method continues to block 785. At block 785, processing logic generates a video (e.g., a smile video) comprising received images and generated synthetic images.

In embodiments, the operations of method 600 may be combined with the operations of method 700 to generate videos of a patient's smile that shows prior stages of treatment as well as predicted future stages of treatment.

Figure 8:
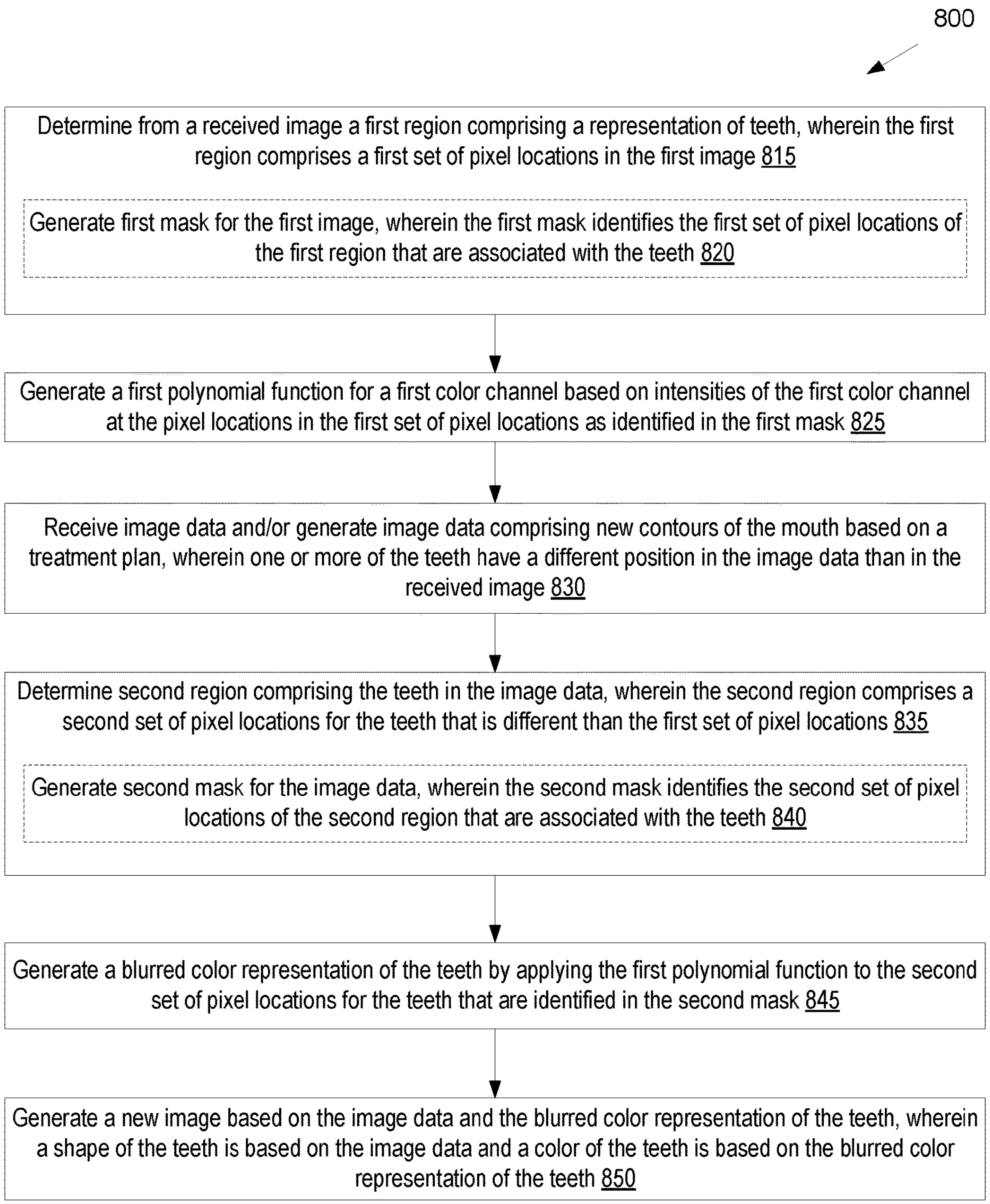
FIG. 8 illustrates a flow diagram for a method of generating simulated images of dental treatment outcomes, in accordance with an embodiment.

FIG. 8 illustrates a flow diagram for a method 800 of generating simulated images of dental treatment outcomes, in accordance with an embodiment. In one embodiment, method 800 is performed at block 720 of method 700. Processing logic may receive a first image of a patient's face and/or mouth. The image may be an image of the patient smiling with their mouth open such that the patient's teeth and gingiva are showing. The first image may be a two-dimensional (2D) color image in embodiments.

At block 815, processing logic determines from the first image a first region comprising a representation of teeth. The first region may include a first set of pixel locations (e.g., x and y coordinates for pixel locations) in the first image. The first region may be determined using a first mask of the first image in some embodiments, where the first mask identifies the first set of pixel locations of the first region that are associated with the teeth. The first mask may additionally identify pixel locations of a second region of the first image that is associated with gingiva.

In one embodiment, processing logic generates the first mask for the first image at block 820. The first mask may be generated based on user input identifying the first region and/or the second region. For example, a user may trace an outline of the teeth and an outline of the gingiva in the first image, and the first mask may be generated based on the traced outlines. In one embodiment, the first mask is generated automatically using one or more trained neural network (e.g., such as a deep neural network). For example, a first neural network may process the first image to determine a bounding box around the teeth and gingiva. The image data within the bounding box may then be processed using a second trained neural network and/or one or more image processing algorithms to identify the gingiva and/or teeth within the bounding box. This data may then be used to automatically generate the first mask without user input.

At block 825, processing logic generates a first parametric function for a first color channel based on intensities of the color channel at the pixel locations in the first set of pixel locations as identified in the first mask. Processing logic may also generate a second parametric function for a second color channel, a third parametric function for a third color channel, and/or one or more additional parametric functions for additional color channels (for color spaces that have more than three channels). Any color space may be used for the color channels associated with the parametric functions. For example, a red-blue-green color space may be used, in which a first parametric function may be generated for the red color channel, a second parametric function may be generated for the blue color channel and a third parametric function may be generated for the green color channel. A non-exhaustive list of other example color spaces that may be used include the hue, saturation, value (HSV) color space, the hue, saturation, luminance (HSL) color space, the YUV color space, the LAB color space, and the cyan, magenta, yellow black (CMYK) color space.

The parametric functions generated at block 825 are global blurring functions that may be used to generate blurred representations of teeth. Any type of polynomial function may be used for the global blurring functions. Some examples of polynomial functions that may be used include first order polynomial functions, second order polynomial functions, third order polynomial functions, fourth order polynomial functions, and so on. Other types of parametric functions that may be used include trigonometric functions, exponential functions, fractional powers, and so on. The parametric functions may be smooth functions that vary in the x direction and/or in the y direction. For example, the parametric functions may vary in only the x direction, in only the y direction, or in both the x direction and the y direction. The parametric functions are global functions that incorporate some local information. In one embodiment, the parametric functions are biquadratic functions (e.g., such as set forth in equation 3 above). In one embodiment, one or more of the parametric functions are biquadratic functions that lack cross terms (e.g., equation 3 above without the waxy term). In other embodiments, the parametric functions may be, for example, linear polynomial functions, bilinear polynomial functions, and so on.

Each parametric function may be initially set up with unsolved weights (e.g., unsolved values for $w_0$, $w_1$, $w_2$, $w_3$, $w_4$ and $w_5$ for equation 3 above). Processing logic may then perform linear regression to solve for the values of the weights (also referred to as parameters) using the intensity values of the pixel locations indicated by the mask. In one embodiment, the least squares technique is applied to solve for the weights (e.g., as set forth in equations 4-7 above).

A similar process as set forth above may also be used to generate a set of blurring functions for gingiva. Alternatively, a Gaussian blurring function may be used for gingiva (e.g., as set forth in equations 8-9 above).

At block 830, processing logic receives image data and/or generates image data comprising new contours of the mouth based on a treatment plan. The image data may be a 2D sketch of mid-treatment or post-treatment dentition, a projection of a 3D virtual model of a dental arch into a 2D plane, or other image data. A 3D virtual model may be oriented such that the mapping of the 3D virtual model into the 2D plane results in a simulated 2D sketch of the teeth and gingiva from a same perspective from which the first image was taken in some embodiments. The 3D virtual model may be included in a treatment plan, and may represent a final or intermediate shape of the upper and/or lower dental arches of a patient after treatment is complete. Alternatively, or additionally, one or more 2D sketches of mid-treatment or post-treatment dentition may be included in the treatment plan, with or without a 3D virtual model of the dental arch. Alternatively, or additionally, one or more 2D sketches may be generated from a 3D template. The image data may be a line drawing that includes contours of the teeth and gingiva, but that lacks color data for one or more regions (e.g., a region associated with the teeth). In one embodiment, generating the image data comprises projecting the 3D virtual model of an upper and/or lower dental arch into a 2D plane.

In one embodiment, generating the image data comprises inferring a likely 3D structure from the first image, matching the 3D structure to a template for a dental arch (e.g., a template with an ideal tooth arrangement), and then projecting the template into 2D. The 3D template may be selected from a set of available 3D templates, and the 3D template may be a template having a dental arch that most closely matches a dental arch in the first image. The 3D template may be oriented such that the mapping of the 3D template into the 2D plane results in a 2D sketch of teeth and gingiva from a same perspective from which the first image was taken in some embodiments.

At block 835, processing logic determines a second region comprising the teeth in the image data. The second region comprising the teeth may comprise a second set of pixel locations for the teeth that is different than the first set of pixel locations. For example, a treatment plan may call for the repositioning of one or more teeth of the patient. The first image may show those teeth in their initial positions and/or orientations (e.g., which may include a malocclusion), and the image data may show those teeth in their final positions and/or orientations (e.g., in which a previous malocclusion may have been treated).

In one embodiment, processing logic generates a second mask for the image data at block 840. Processing logic may also generate another mask for the gingiva for the image data. The second mask may identify the second set of pixel locations associated with the new positions and/or orientations of the teeth. The other mask for the gingiva may indicate pixel locations for the upper and/or lower gingiva post treatment. The second mask (and optionally other mask) may be generated in the same manner as discussed above with regards to the first mask. In some embodiments, a 3D virtual model or 3D template includes information identifying teeth and gingiva. In such an embodiment, the second mask and/or other mask may be generated based on the information in the virtual 3D model or 3D template identifying the teeth and/or the gingiva.

At block 845, processing logic generates a blurred color representation of the teeth by applying the first parametric function to the second set of pixel locations for the teeth that are identified in the second mask. This may include applying multiple different parametric functions to pixel locations in the image data as specified in the second mask. For example, a first parametric function for a first color channel may be applied to determine intensities or values of that first color channel for each pixel location associated with teeth, a second parametric function for a second color channel may be applied to determine intensities or values of that second color channel for each pixel location associated with the teeth, and a third parametric function for a third color channel may be applied to determine intensities or values of that third color channel for each pixel location associated with the teeth. The blurred color representation of the teeth may then include, for each pixel location associated with teeth in the image data, three different color values, one for each color channel. A similar process may also be performed for the gingiva by applying one or more blurring functions to the pixel locations associated with the gingiva. Accordingly a single blurred color image may be generated that includes a blurred color representation of the teeth and a blurred color representation of the gingiva, where different blurring functions were used to generate the blurred color data for the teeth and gingiva.

At block 850, a new image is generated based on the image data (e.g., the sketch containing contours of the teeth and gingiva) and the blurred color image (e.g., which may contain a blurred color representation of the teeth and optionally a blurred color representation of the gingiva). A shape of the teeth in the new simulated image may be based on the image data and a color of the teeth (and optionally gingiva) may be based on the blurred color image containing the blurred color representation of the teeth and/or gingiva. In one embodiment, the new image is generated by inputting the image data and the blurred color image into an artificial neural network that has been trained to generate images from an input line drawing (sketch) and an input blurred color image. In one embodiment, the artificial neural network is a GAN. In one embodiment, the GAN is a picture to picture GAN.

Figure 9:
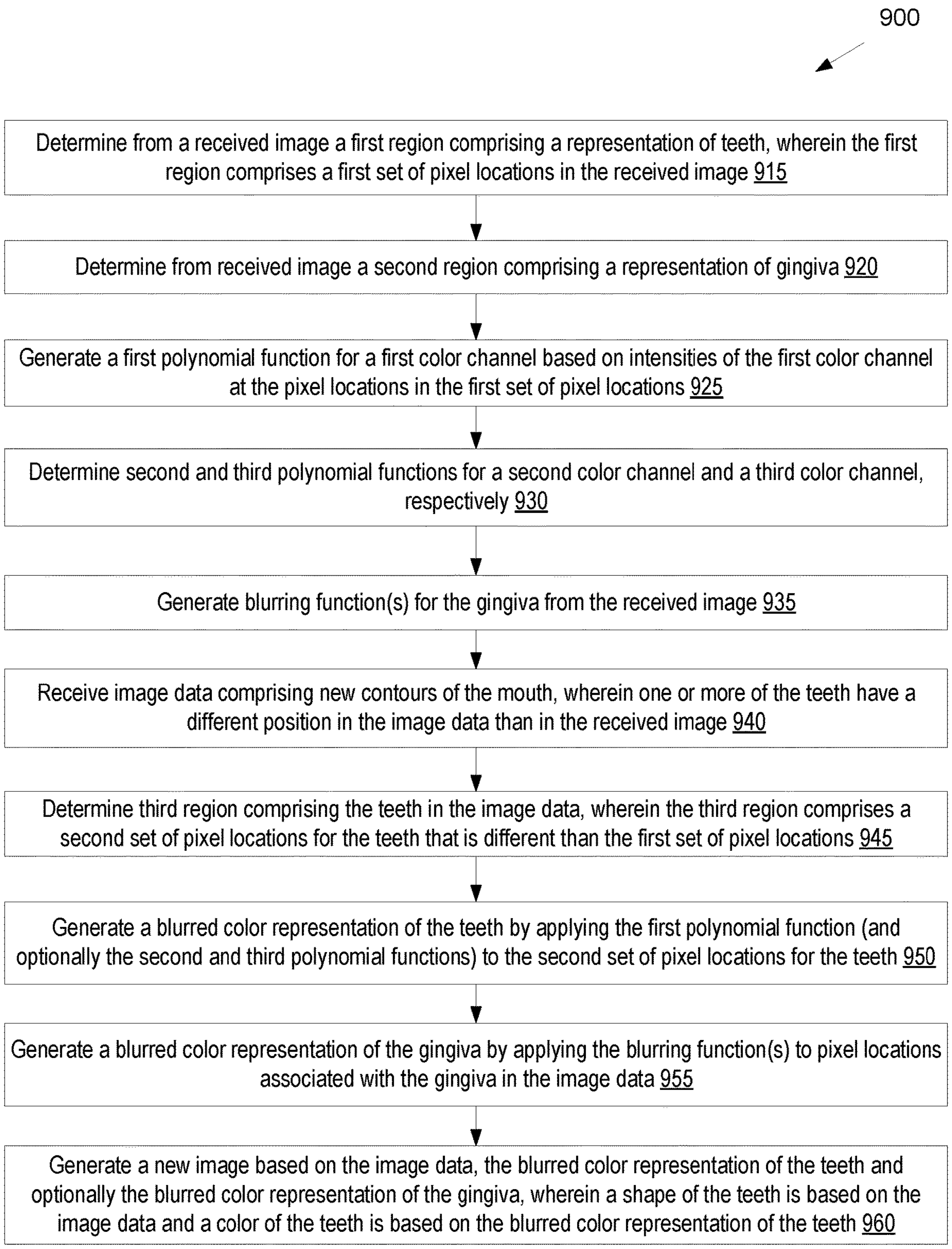
FIG. 9 also illustrates a flow diagram for a method of generating simulated images of dental treatment outcomes, in accordance with an embodiment.
Figure 10:
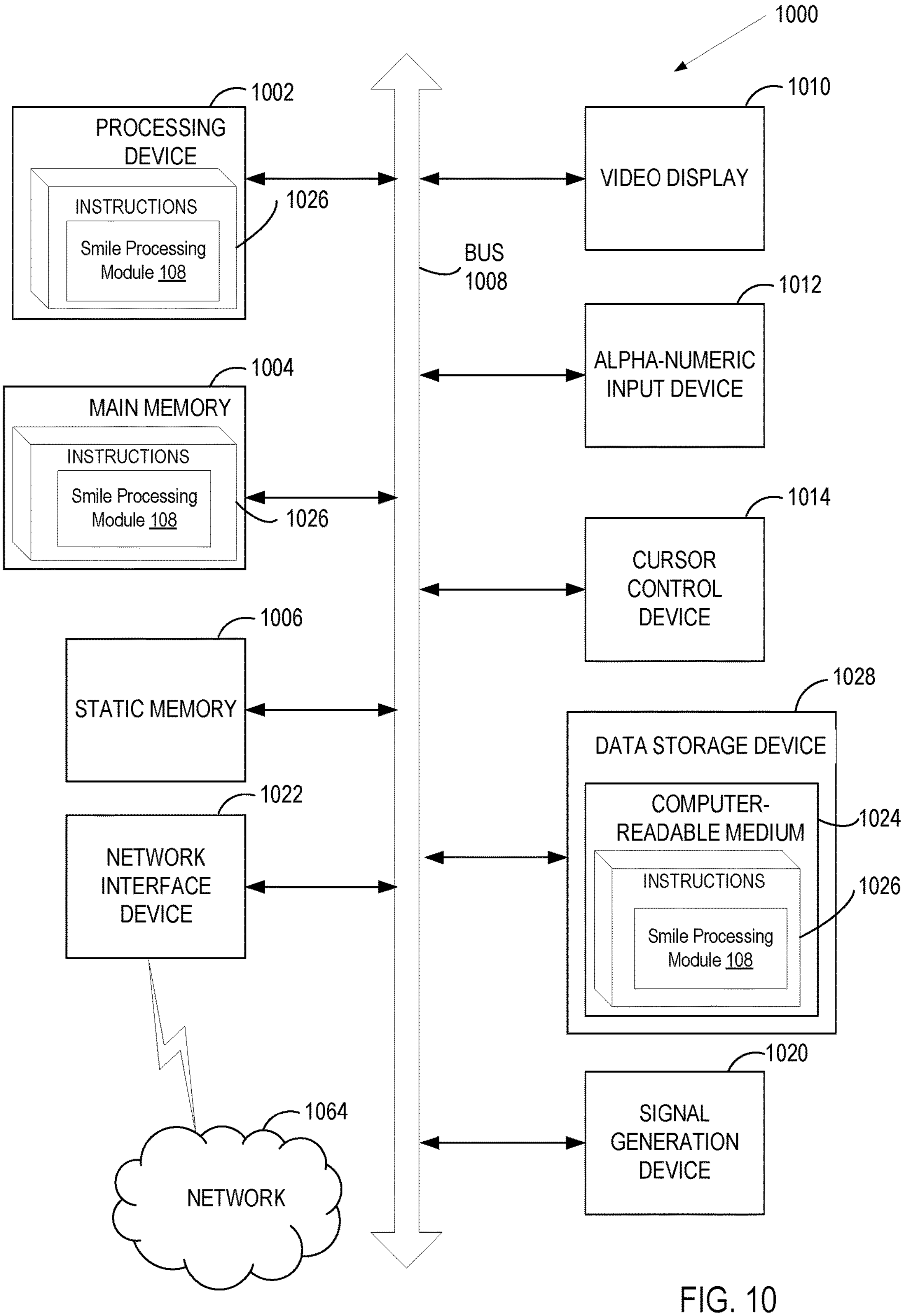
FIG. 10 illustrates a block diagram of an example computing device, in accordance with embodiments of the present disclosure.

FIG. 9 also illustrates a flow diagram for a method 900 of generating simulated images of dental treatment outcomes, in accordance with an embodiment. In one embodiment, method 900 is performed at block 720 of method 700. At block 910 of method 900, processing logic receives a first image of a patient's face and/or mouth. The image may be an image of the patient smiling with their mouth open such that the patient's teeth and gingiva are showing. The first image may be a two-dimensional (2D) color image in embodiments.

At block 915, processing logic determines from the first image a first region comprising a representation of teeth. The first region may include a first set of pixel locations (e.g., x and y coordinates for pixel locations) in the first image. At block 920, processing logic may determine from the first image a second region comprising a representation of gingiva. The second region may include a second set of pixel locations in the first image.

The first region may be determined using a first mask of the first image in some embodiments, where the first mask identifies the first set of pixel locations of the first region that are associated with the teeth. The second region may be determined using a second mask of the first image, where the second mask identifies the second set of pixel locations of the second region that are associated with the gingiva. In one embodiment, a single mask identifies the first region associated with the teeth and the second region associated with the gingiva. In one embodiment, processing logic generates the first mask and/or the second mask as described with reference to block 820 of method 800.

At block 925, processing logic generates a first parametric function for a first color channel based on intensities (or other values) of the color channel at the pixel locations in the first set of pixel locations as identified in the first mask. At block 930, processing logic may also generate a second parametric function for a second color channel, a third parametric function for a third color channel, and/or one or more additional parametric functions for additional color channels (for color spaces that have more than three channels). Any color space may be used for the color channels associated with the parametric functions. For example, a red-blue-green color space may be used, in which a first parametric function may be generated for the red color channel, a second parametric function may be generated for the blue color channel and a third parametric function may be generated for the green color channel. A non-exhaustive list of other example color spaces that may be used include the hue, saturation, value (HSV) color space, the hue, saturation, luminance (HSL) color space, the YUV color space, the LAB color space, and the cyan, magenta, yellow black (CMYK) color space.

The parametric functions generated at blocks 925 and 930 are global blurring functions that may be used to generate blurred representations of teeth. Any of the aforementioned types of parametric functions may be used for the global blurring functions.

At block 935, blurring functions may be generated for the gingiva from the first image. In one embodiment, a set of parametric functions is generated for the gingiva in the same manner as set forth above for the teeth. For example, a mask identifying pixel locations associated with gingiva may be used to identify the pixel locations to be used to solve for the weights of one or more parametric functions. Alternatively, a Gaussian blurring function may be used for the gingiva (e.g., as set forth in equations 8-9 above) using the pixel locations associated with the gingiva.

At block 940, processing logic receives image data and/or generates image data comprising new contours of the mouth based on a treatment plan. The image data may be a projection of a 3D virtual model of a dental arch into a 2D plane. The 3D virtual model may be oriented such that the mapping of the 3D virtual model into the 2D plane results in a simulated 2D sketch of the teeth and gingiva from a same perspective from which the first image was taken in some embodiments. The 3D virtual model may be included in a treatment plan, and may represent a final shape or intermediate shape of the upper and/or lower dental arches of a patient after treatment is complete. The image data may be a line drawing that includes contours of the teeth and gingiva, but that lacks color data. In one embodiment, generating the image data comprises projecting the 3D virtual model of an upper and/or lower dental arch into a 2D plane.

At block 945, processing logic determines a third region comprising the teeth in the image data. The third region comprising the teeth may comprise a second set of pixel locations for the teeth that is different than the first set of pixel locations. In one embodiment, processing logic generates a second mask for the image data, and the second mask is used to determine the third region.

At block 950, processing logic generates a blurred color representation of the teeth by applying the first parametric function and optionally the second, third and/or fourth parametric functions to the second set of pixel locations for the teeth that are associated with the third region. The blurred color representation of the teeth may then include, for each pixel location associated with teeth in the image data, three (or four) different color values, one for each color channel. The third region of the image data may have more or fewer pixels than the first region of the first image. The parametric function works equally well whether the third region has fewer pixels, the same number of pixels, or a greater number of pixels.

At block 955, processing logic may generate a blurred color representation of the gingiva by applying the one or more blurring functions for the gingiva to pixel locations associated with the gingiva in the image data. The blurred color representation of the teeth may be combined with the blurred color representation of the gingiva to generate a single blurred color image.

At block 960, a new image is generated based on the image data (e.g., the sketch containing contours of the teeth and gingiva) and the blurred color image (e.g., which may contain a blurred color representation of the teeth and optionally a blurred color representation of the gingiva). A shape of the teeth in the new simulated image may be based on the image data and a color of the teeth (and optionally gingiva) may be based on the blurred color image containing the blurred color representation of the teeth and/or gingiva. In one embodiment, the new image is generated by inputting the image data and the blurred color image into an artificial neural network that has been trained to generate images from an input line drawing (sketch) and an input blurred color image. In one embodiment, the artificial neural network is a GAN. In one embodiment, the GAN is a picture to picture GAN.

In some instances the lower gingiva may not be visible in the first image, but may be visible in the new simulated image that is generated at block 960. In such instances, parametric functions generated for the use of blurring the color data for the gingiva may cause the coloration of the lower gingiva to be inaccurate. In such instances, one or more Gaussian blurring functions may be generated for the gingiva at block 935.

FIG. 10 illustrates a diagrammatic representation of a machine in the example form of a computing device 1000 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In one embodiment, the computing device 1000 corresponds to computing device 105 of FIG. 1.

The example computing device 1000 includes a processing device 1002, a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1028), which communicate with each other via a bus 1008.

Processing device 1002 represents one or more general-purpose processors such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute the processing logic (instructions 1026) for performing operations and steps discussed herein.

The computing device 1000 may further include a network interface device 1022 for communicating with a network 1064. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1028 may include a machine-readable storage medium (or more specifically a non-transitory computer-readable storage medium) 1024 on which is stored one or more sets of instructions 1026 embodying any one or more of the methodologies or functions described herein, such as instructions for a smile processing module 108. A non-transitory storage medium refers to a storage medium other than a carrier wave. The instructions 1026 may also reside, completely or at least partially, within the main memory 1004 and/or within the processing device 1002 during execution thereof by the computing device 1000, the main memory 1004 and the processing device 1002 also constituting computer-readable storage media.

The computer-readable storage medium 1024 may also be used to store a smile processing module 108. The computer readable storage medium 1024 may also store a software library containing methods for a smile processing module 108. While the computer-readable storage medium 1024 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A system comprising:

a memory; and a processing device operatively coupled to the memory, wherein the processing device is to:

receive, after dental treatment of an individual has commenced, a plurality of images captured by one or more image capture devices and comprising teeth of the individual, wherein the plurality of images are arranged in a sequence and each of the plurality of images is taken on a different date and is associated with a different stage of treatment of the teeth, and wherein the plurality of images comprise one or more images taken under different conditions than one or more other images of the plurality of images;

perform at least one of modifying or replacing one or more images of the plurality of images to align the plurality of images to one another and mitigate, between the images, differences attributable to the different conditions;

generate one or more synthetic images, wherein each synthetic image of the one or more synthetic images is generated based on a pair of sequential images in the sequence and is an intermediate image that comprises an intermediate state of the teeth between a first state of a first image of the pair of sequential images and a second state of a second image of the pair of sequential images; and generate a video comprising the plurality of images and the one or more synthetic images.

2. The system of claim 1, wherein modifying the one or more images of the plurality of images comprises modifying colors of the plurality of images such that the colors are consistent between the plurality of images.

3. The system of claim 2, wherein modifying the colors of the plurality of images comprises inputting the plurality of images into a trained machine learning model, wherein the trained machine learning model outputs color modifications for one or more of the plurality of images.

4. The system of claim 3, wherein the trained machine learning model comprises a convolutional neural network that performs one or more wavelet transforms.

5. The system of claim 1, wherein modifying an image of the one or more images comprises performing at least one of a translation, a rotation, or a scale change for one or more points of the image.

6. The system of claim 5, wherein the processing device is further to:

detect a plurality of features that are common to at least some of the plurality of images; and determine, for a pair of sequential images of the plurality of images in the sequence, and for each feature of one or more features of the plurality of features, an affine transformation for the feature between a first image and a second image of the pair of sequential images, wherein application of the affine transformation to at least one of the first image or the second image results in at least one of the translation, the rotation, or the scale change for the one or more points of the image.

7. The system of claim 6, wherein detecting the plurality of features for the image comprises inputting the image into a trained machine learning model, wherein the trained machine learning model outputs locations of each of the plurality of features in the image.

8. The system of claim 6, wherein the plurality of features comprise one or more of the teeth.

9. The system of claim 6, wherein the plurality of images are of a face of the individual, wherein the teeth of the individual are visible in the plurality of images of the face, and wherein the plurality of features comprise one or more facial features.

10. The system of claim 1, wherein replacing the one or more images of the plurality of images comprises:

generating, for an image of the one or more images, a replacement image having a) teeth that correspond to teeth of the image and b) one or more features that differ from one or more features of the image and that are similar to one or more features of an additional image of the plurality of images, wherein the replacement image is used to replace the image.

11. The system of claim 10, wherein generating the replacement image comprises:

processing the image and the additional image using a trained machine learning model, wherein the trained machine learning model outputs the replacement image.

12. The system of claim 11, wherein the trained machine learning model is a generative model.

13. The system of claim 10, wherein the one or more features of the image comprise a first camera viewpoint, and wherein the one or more features of the additional image comprise a second camera viewpoint.

14. The system of claim 10, wherein:

the one or more features of the image comprise at least one of a first facial expression, a first jaw position, a first relation between an upper jaw and a lower jaw, a first color, a first lighting condition, an obstruction of the teeth, one or more teeth attachments, a first hair style, or first clothing; and the one or more features of the additional image comprise at least one of a second facial expression, a second jaw position, a second relation between the upper jaw and the lower jaw, a second color, a second lighting condition, a lack of the obstruction of the teeth, a lack of the one or more teeth attachments, a second hair style, or second clothing.

15. The system of claim 1, wherein replacing the one or more images of the plurality of images comprises:

generating, for an image of the one or more images, a replacement image having a) teeth that correspond to teeth of the image and b) one or more features that differ from one or more features of the image, wherein the replacement image is used to replace the image.

16. The system of claim 15, wherein generating the replacement image comprises:

receiving an input selecting one or more target features; and processing the image and the input using a trained machine learning model, wherein the trained machine learning model outputs the replacement image having the one or more features that correspond to the one or more target features.

17. The system of claim 1, wherein generating a synthetic image of the one or more synthetic images comprises:

determining, for a pair of sequential images of the plurality of images in the sequence, an optical flow between a first image and a second image of the pair of sequential images; and generating the synthetic image based on the optical flow.

18. The system of claim 1, wherein generating a synthetic image of the one or more synthetic images comprises:

inputting a pair of sequential images of the plurality of images in the sequence into a trained machine learning model, wherein the trained machine learning model outputs the synthetic image.

19. The system of claim 18, wherein the trained machine learning model comprises a generative model.

20. The system of claim 19, wherein one or more layers of the generative model determine an optical flow between the pair of sequential images, and wherein the optical flow is used by the generative model to generate the synthetic image.

21. The system of claim 1, wherein generating a synthetic image of the one or more synthetic images comprises:

transforming a first image and a second image in the sequence into a feature space;

determining an optical flow between the first image and the second image in the feature space; and using the optical flow in the feature space to generate the synthetic image that is an intermediate image between the first image and the second image.

22. The system of claim 1, wherein generating the one or more synthetic images comprises:

generating, based on a first image and a second image in the sequence, a first synthetic image that is an intermediate image between the first image and the second image; and generating, based on the first image and the first synthetic image, a second synthetic image that is an intermediate image between the first image and the first synthetic image.

23. The system of claim 22, wherein the processing device is further to:

determine a similarity score between the first image and the first synthetic image; and generate the second synthetic image responsive to determining that the similarity score fails to satisfy a similarity threshold.

24. A non-transitory computer readable medium comprising instructions that, when executed by a processing device, cause the processing device to perform operations comprising:

receiving, after dental treatment of an individual has commenced, a plurality of images captured by one or more image capture devices and comprising teeth of the individual, wherein the plurality of images are arranged in a sequence and each of the plurality of images is taken on a different date and is associated with a different stage of treatment of the teeth, and wherein the plurality of images comprise one or more images taken under different conditions than one or more other images of the plurality of images;

performing at least one of modifying or replacing one or more images of the plurality of images to align the plurality of images to one another and mitigate, between the images, differences attributable to the different conditions;

generating one or more synthetic images, wherein each synthetic image of the one or more synthetic images is generated based on a pair of sequential images in the sequence and is an intermediate image that comprises an intermediate state of the teeth between a first state of a first image of the pair of sequential images and a second state of a second image of the pair of sequential images; and generating a video comprising the plurality of images and the one or more synthetic images.

25. A method comprising:

receiving, after dental treatment of an individual has commenced, a plurality of images captured by one or more image capture devices and comprising teeth of the individual, wherein the plurality of images are arranged in a sequence and each of the plurality of images is taken on a different date and is associated with a different stage of treatment of the teeth, and wherein the plurality of images comprise one or more images taken under different conditions than one or more other images of the plurality of images;

performing at least one of modifying or replacing one or more images of the plurality of images to align the plurality of images to one another and mitigate, between the images, differences attributable to the different conditions;

generating one or more synthetic images, wherein each synthetic image of the one or more synthetic images is generated based on a pair of sequential images in the sequence and is an intermediate image that comprises an intermediate state of the teeth between a first state of a first image of the pair of sequential images and a second state of a second image of the pair of sequential images; and generating a video comprising the plurality of images and the one or more synthetic images.

* * * * *